United States Patent
Tamura et al.

(10) Patent No.: US 6,727,041 B1
(45) Date of Patent: Apr. 27, 2004

(54) OPTICAL RECORDING MEDIA

(75) Inventors: Shinichiro Tamura, Kanagawa (JP); Mitsuaki Oyamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/403,669

(22) PCT Filed: Apr. 23, 1998

(86) PCT No.: PCT/JP98/01881

§ 371 (c)(1),
(2), (4) Date: Feb. 7, 2000

(87) PCT Pub. No.: WO98/47717

PCT Pub. Date: Oct. 29, 1998

(30) Foreign Application Priority Data

Apr. 23, 1997 (JP) ............................. P9-106417

(51) Int. Cl.$^7$ ................................. G11B 7/24
(52) U.S. Cl. ..................... 430/270.21; 430/270.19; 430/270.2; 430/945; 369/288; 428/64.8
(58) Field of Search ............. 430/945, 270.18, 430/270.19, 270.2, 270.21; 428/288; 369/64.8

(56) References Cited

U.S. PATENT DOCUMENTS

| 4,412,231 A | * | 10/1983 | Namba et al. | 430/945 |
|---|---|---|---|---|
| 4,460,665 A | * | 7/1984 | Kunekane et al. | 430/270.2 |
| 4,614,705 A | * | 9/1986 | Umehara et al. | 430/270.21 |
| 4,696,892 A | * | 9/1987 | Abe et al. | 430/945 |
| 4,767,693 A | * | 8/1988 | Oba et al. | 430/270.21 |
| 4,767,696 A | * | 8/1988 | Ishimoto et al. | 430/270.2 |
| 4,994,343 A | * | 2/1991 | Inagaki et al. | 430/270.21 |
| 5,075,147 A | | 12/1991 | Usami et al. | 430/945 |
| 5,316,899 A | * | 5/1994 | Miyadera et al. | 430/270.2 |
| 5,512,416 A | * | 4/1996 | Namba et al. | 430/270.21 |
| 5,574,715 A | * | 11/1996 | Namba et al. | 430/270.21 |
| 5,633,106 A | * | 5/1997 | Aihara et al. | 430/270.2 |
| 5,776,656 A | * | 7/1998 | Shinkai et al. | 430/270.21 |
| 5,976,658 A | * | 11/1999 | Tomizawa et al. | 430/945 |

FOREIGN PATENT DOCUMENTS

| EP | 147083 | * | 7/1985 |
|---|---|---|---|
| EP | 0 218 263 A2 | | 10/1986 |
| EP | 0 319 343 A2 | | 12/1988 |
| EP | 0 410 879 A2 | | 7/1990 |
| EP | 0 840 307 A2 | | 10/1997 |
| JP | 62-268689 | * | 11/1982 |
| JP | 64-27995 | | 1/1989 |
| JP | 02-044524 | * | 2/1990 |
| JP | 02-200486 | * | 8/1990 |
| JP | 03-218287 | * | 12/1991 |
| JP | 06/336086 | * | 12/1994 |
| JP | 07-309069 | * | 11/1995 |
| JP | 08-337728 | * | 12/1996 |
| JP | 09-099642 | * | 4/1997 |

OTHER PUBLICATIONS

US 5,142,546, 8/1992, Spiecker (withdrawn)*
Hamer, "The Cyanine Dyes and Related Compounds", pp. 34–73,93–105,116–145,317,352–357 and 688–691.*

* cited by examiner

*Primary Examiner*—Martin Angebrannt
(74) *Attorney, Agent, or Firm*—Sonnenschein, Nath & Rosenthal LLP

(57) ABSTRACT

Optical recording media comprising a base (1), a recording layer (2) formed thereon, and a reflecting layer (3) formed on the layer (2), wherein the recording layer (2) contains at least one kind of specified dyes selected from among polymethine dyes having 1 to 4 carbon atoms in the main methine chain to secure a sufficient recording sensitivity to a light in the red wavelength region.

5 Claims, 15 Drawing Sheets

OPTICAL RECORDING MEDIA

TECHNICAL FIELD

The present invention relates to an optical recording medium and in particular, to an optical recording medium of a writable type using an organic pigment as a recording material.

BACKGROUND OF THE INVENTION

With the advent of information-oriented society, a request for a large-capacity memory for recording a great amount of information such as image, voice, and data is becoming stronger and stronger.

In order to answer such a request, a disc-shaped optical recording medium has a large recording capacity and a high reliability as recording and reproduction are carried out in a non-contact state. Besides, such a disc-shaped optical disc has various other merits that it can easily be carried and produced at reasonable costs in a mass production, and has been widely spread up to now.

As a recording material of an optical recording medium, the have been proposed various materials: rare earth-transition metal amorphous alloy thin film such as Tb—Fe—Co, a phase change material such as Ge—Se—Te, an organic pigment material such as cyanine pigment. Among these materials, the organic pigment is used in a writable optical recording medium on which a user can write in once. This material has no problem of corrosion and is low in toxicity, which is a merit that only a small environmental load is caused.

As a specific configuration example of an optical recording medium using such an organic pigment, there can be exemplified the following.

Firstly, there can be exemplified an air sandwich configuration consisting of two light transmitting substrates each having a recording layer containing an organic pigment and bonded so as to oppose the recording layers to each other and to form an air layer between the substrates. This air sandwich type optical recording medium is available in market for data recording.

After this, the Proceeding of SPIE, vol. 1078, page 1078 discloses a configuration having a recording layer containing an organic pigment, an optical reflection layer, and a protection layer successively formed on an light transmitting substrate, i.e., a normal compact disc configuration having a recording layer containing an organic pigment. As this optical recording medium has a high reflection ratio of 70% or above in a wavelength band of 780 nm used in a compact disc, after recording it is possible to obtain a signal characteristic compatible with a compact disc on market. This optical recording medium is used for music recording, video recording, and a personal computer data recording and now is forming a large market.

Moreover, in the field of optical recording, besides such a recording material and medium configuration, study has been made on the optical system for recording.

That is, in the optical recording medium, a laser beam is used for recording and reproduction.

In recording, a laser beam is focused on a recording layer and within the laser spot, an optical change is generated in the recording layer so as to form a pit. Moreover, in reproduction, a laser beam is focused on the pit so as to detect a difference between the reflection ratios of the pit and a portion not having the pit. The recording density on such an optical recording medium is determined by a laser beam spot diameter. As this spot diameter is reduced, it is possible to record with a higher density.

On the other hand, the laser beam spot diameter is proportional to the L/NA of the optical recording/reproduction optical system (wherein NA is a numerical aperture of the objective lens and L is the wavelength of the laser beam). Consequently, the recording density of the optical recording medium is determined by the numerical aperture NA of the objective lens used in this optical system and the wavelength L of the laser source. As the NA increases and the L decreases, the recording density can be increased.

For this, recently, a study has been made so as to reduce the wavelength of the semiconductor laser as a laser source. For example, as reported in "O plus E", vol 199, page 71 (1996), there is a trial to apply a semiconductor laser having a wavelength band of 630 nm to 650 nm for optical recording.

However, when reducing the wavelength of the laser beam for recording and reproduction, it is necessary to select a recording material matched with the wavelength band. An organic pigment is selected because of having a sufficient optical absorption and reflection ratio in the wavelength band of the laser beam for recording and reproduction.

For this purpose, for example, organic pigments to be used for 630 nm to 650 nm are disclosed in Japanese Patent Laid-Open 6-40161, Japanese Patent Laid-Open 6-40162, Japanese Patent Laid-Open 6-199045, and Japanese Patent Laid-Open 7-186530.

However, these organic pigments do not have a sufficient optical absorption or reflection ratio in the range from 630 nm to 650 nm and have a problem in the recording sensitivity and the signal modulation degree.

SUMMARY OF THE INVENTION

It is therefore object of the present invention to provide an optical recording medium showing a high reflection ratio and an appropriate optical absorption in the short wavelength range of 630 nm to 650 nm and enabling a preferable recording and reproduction characteristic.

In order to achieve the aforementioned object, the inventor studied and found that a polymethine pigment having 1 to 4 carbons in the methine main chain and an atomic groups including a predetermined aromatic ring at both ends enables a high reflection ratio and an appropriate optical absorption in a wavelength band from 630 nm to 650 nm.

The optical recording medium according to the present invention has been proposed according to the aforementioned finding and includes a recording layer and reflection layer formed on a light transmitting substrate, the recording layer formed as (1) a pigment layer containing at least one of a pigment compound a, pigment compound b, and pigment compound c; (2) an organic pigment layer containing at least two of the pigment compound a, the pigment compound b, and the pigment compound c; (3) an organic pigment layer containing at least one of the pigment compound a, the pigment compound b, and the pigment compound c in combination with at least one of a pigment compound d, a pigment compound e, and a pigment compound f; (4) an organic pigment layer containing at least one of the pigment compound a, the pigment compound b, and the pigment compound c in combination with a pigment compound g, a pigment compound h, a pigment compound i, and a pigment compound j; (5) an organic pigment layer containing at least one of the pigment compound a, the pigment compound b, and the pigment compound c in combination with at least one of the pigment compound d, the pigment compound e, and the pigment compound f in combination with at least one of the pigment compound d, the pigment compound e, and the pigment compound f; (6) an organic pigment layer containing at least two of the pigment compound d, the pigment compound e, and the pigment compound f; or (7) an organic pigment layer containing at least one of the pigment compound d, the pigment compound e, and the pigment compound f, and pigment compound j in combination with at least one of the pigment compound d, the pigment compound e, and the pigment compound f.

These organic pigment layers enable a high absorption degree and a reflection ratio in the wavelength band from 630 nm to 650 nm and show a small wavelength dependency in this range. Consequently, the optical recording medium having a recording layer made from these organic pigments enables to obtain a high recording sensitivity and a signal modulation degree in the wavelength band of 630 nm to 650 nm.

Pigment compound a:

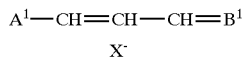

(wherein X— represents Br—, I—, $ClO_4$—, $BF_4$—, $PF_6$—, and $SbF_6$—. Moreover, $A^1$ is an atomic group expressed by Chemical Formulae 136 to 138, and $B^1$ is an atomic group expressed by Chemical Formula 139.)

[Chemical Formula 136]

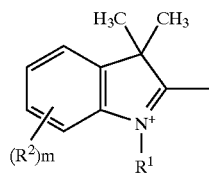

[Chemical Formula 137]

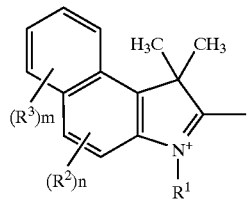

[Chemical Formula 138]

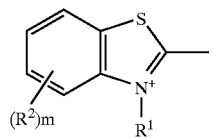

[Chemical Formula 139]

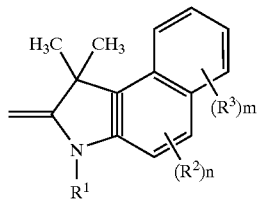

(In Chemical Formulae 136 to 139, $R^1$ represents an alkyl group, alkoxy group, and aryl group. When a molecule contains a plurality of $R^1$, the $R^1$ may be either identical substituents or different substituents from one another.

Moreover, $R^2$ and $R^3$ represent an hydrogen atom, alkyl group, alkoxy group, amino group, nitro group, cyano group, aryl group, alkoxycarbonyl group, sulfonylalkyl group, and halogen atom. When a molecule contains a plurality of $R^2$ or a plurality of $R^3$, the $R^2$ or $R^3$ may be identical substitutens or different substituents from one another n is 1 or 2; and m is 1, 2, 3, or 4.)

Pigment compound b:

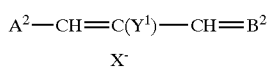

(wherein X— represents Br—, I—, $ClO_4$—, $BF_4$—, $PF_6$—, and $SbF_6$—. $A^2$ is an atomic group expressed by Chemical Formulae 140 to 143, and $B^2$ is an atomic group expressed by Chemical Formula 144. Moreover, $Y^1$ is a hydrogen atom, alkyl group, or halogen atom.)

[Chemical Formula 140]

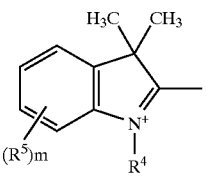

[Chemical Formula 141]

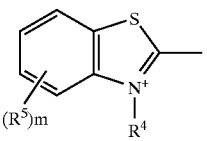

[Chemical Formula 142]

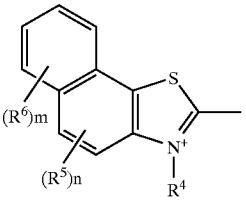

[Chemical Formula 143]

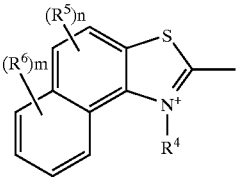

[Chemical Formula 144]

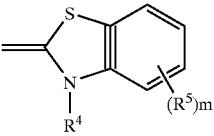

(In Chemical Formulae 140 to 144, R4 represents an alkyl group, alkoxy group and an aryl group. When a molecule contains a plurality of $R^4$, the $R^4$ may not be identical substituents. Moreover, $R^5$ and $R^6$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^5$ or a plurality of $R^6$, the $R^5$ or the $R^6$ may be either identical substituents or different substitutes from one another. The n is 1 or 2; and m is 1, 2, 3, or 4.)

[Chemical Formula 145]

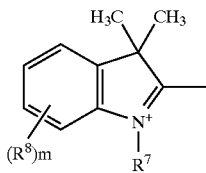

[Chemical Formula 146]

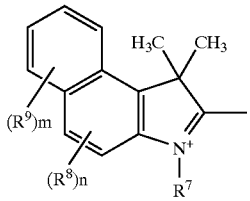

[Chemical Formula 147]

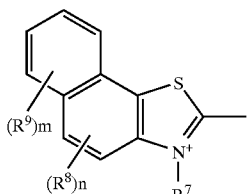

[Chemical Formula 148]

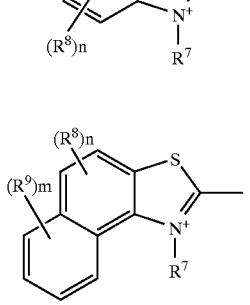

[Chemical Formula 149]

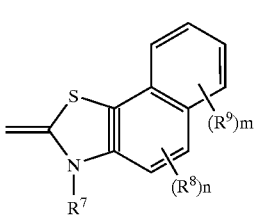

[Chemical Formula 150]

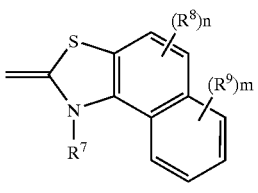

(In Chemical Formulae 145 to 150, $R^7$ represents an alkyl group, alkoxy group and an aryl group. When a molecule contains a plurality of $R^7$, the $R^7$ may be identical substituents or different substituents. Moreover, $R^8$ and $R^9$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^8$ or a plurality of $R^9$, the $R^8$ or the $R^9$ may be either identical substituents or different substitutes from one another. The n is 1 or 2; and m is 1, 2, 3, or 4.)

Pigment compound d:

$A^4$—CH=$B^4$
$X^-$ (wherein X— represents Br—, I—, $ClO_4$—, $BF_4$—, $PF_6$—, and $SbF_6$—. $A^4$ is an atomic group expressed by Chemical Formulae 151, and $B^4$ is an atomic group expressed by Chemical Formulae 152 and 153.)

[Chemical Formula 151]

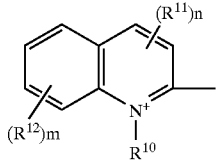

[Chemical Formula 152]

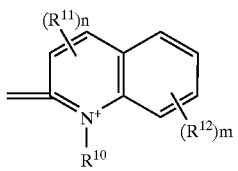

[Chemical Formula 153]

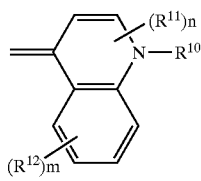

(In Chemical Formulae 151 to 153, $R^{10}$ represents an alkyl group, alkoxy group and an aryl group. When a molecule contains a plurality of $R^{10}$, the $R^{10}$ may be identical substituents or different substituents. Moreover, $R^{11}$ and $R^{12}$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^{11}$ or a plurality of $R^{12}$, the $R^{11}$ or the $R^{12}$ may be either identical substituents or different substitutes from one another. The n is 1 or 2; and m is 1, 2, 3, or 4.)

Pigment Compound e:

$A^5$—CH=CH—$B^5$
$X^-$ (wherein X— represents Br—, I—, $ClO_4$—, $BF_4$—, $PF_6$—, and $SbF_6$—. Moreover, $A^5$ is an atomic group expressed by Chemical Formulae 154 to 159, and $B^5$ is an atomic group expressed by Chemical Formula 160.)

[Chemical Formula 154]

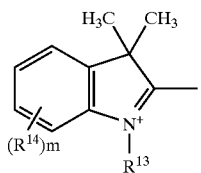

-continued

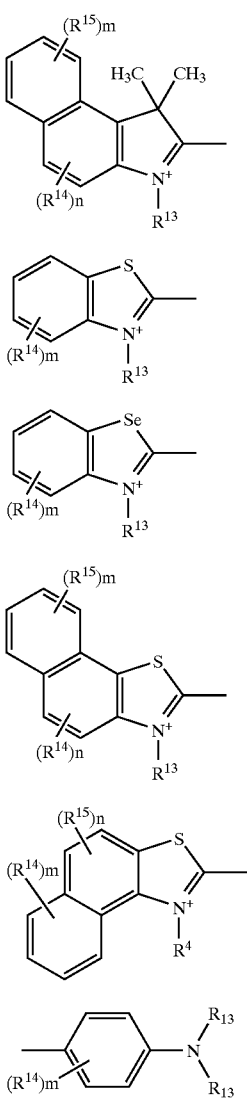

[Chemical Formula 155]

[Chemical Formula 156]

[Chemical Formula 157]

[Chemical Formula 158]

[Chemical Formula 159]

[Chemical Formula 160]

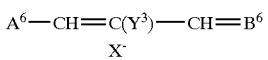

(In Chemical Formulae 154 to 160, $R^{13}$ represents an alkyl group, alkoxy group and an aryl group. When a molecule contains a plurality of $R^{13}$, the $R^{13}$ may be identical substituents or different substituents. Moreover, $R^{14}$ and $R^{15}$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^{14}$ or a plurality of $R^{15}$, the $R^{14}$ or the $R^{15}$ may be either identical substituents or different substitutes from one another. The n is 1 or 2; and m is 1, 2, 3, or 4.)

Pigment compound f:

$$A^6\text{---}CH\text{===}C(Y^3)\text{---}CH\text{===}B^6$$
$$X^-$$

(wherein X— represents Br—, I—, $ClO_4$—, $BF_4$—, $PF_6$—, and $SbF_6$—. Moreover, $A^6$ is an atomic group expressed by Chemical Formulae 161 to 163, and $B^6$ is an atomic group expressed by Chemical Formulae 164 and 165. Moreover, $Y^3$ is a hydrogen atom, alkyl group or halogen atom.)

[Chemical Formula 161]

[Chemical Formula 162]

[Chemical Formula 163]

[Chemical Formula 164]

[Chemical Formula 165]

(In Chemical Formulae 154 to 160, $R^{16}$ and $R^{18}$ represent an alkyl group, alkoxy group and an aryl group. When a molecule contains a plurality of $R^{16}$ or a plurality of $R^{18}$, the $R^{16}$ or $R^{18}$ may be identical substituents or different substituents from one another. Moreover, $R^{17}$ and $R^{19}$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^{17}$ or a plurality of $R^{19}$, the $R^{17}$ or the $R^{19}$ may be either identical substituents or different substitutes from one another. The m is 1, 2, 3, or 4.)

Pigment compound g:

$$A^7\text{---}CH\text{===}B^7$$
$$X^-$$

(wherein X— represents Br—, I—, $ClO_4$—, $BF_4$—, $PF_6$—, and $SbF_6$—. Moreover, $A^7$ is an atomic group expressed by Chemical Formula 166, and $B^7$ is an atomic group expressed by Chemical Formula 167.)

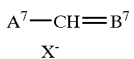

[Chemical Formula 166]

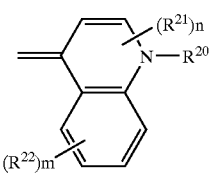

[Chemical Formula 167]

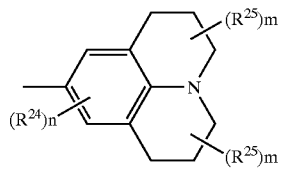

[Chemical Formula 172]

(In Chemical Formulae 166 and 167, $R^{20}$ represents one of an alkyl group, an alkoxy group and an aryl group. When a molecule contains a plurality of $R^{20}$, the $R^{20}$ may be identical substituents or different substituents from one another. Moreover, $R^{21}$ and $R^{22}$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^{21}$ or a plurality of $R^{22}$, the $R^{21}$ or the $R^{22}$ may be either identical substituents or different substitutes from one another. The n is 1 or 2; and m is 1, 2, 3, or 4.)

Pigment compound h:

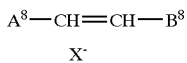

(wherein X— represents Br—, I—, $ClO_4$—, $BF_4$—, $PF_6$—, and $SbF_6$—. Moreover, $A^8$ is an atomic group expressed by Chemical Formulae 168 to 171, and $B^8$ is an atomic group expressed by Chemical Formula 172.)

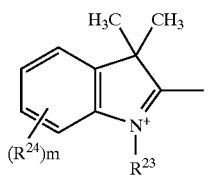

[Chemical Formula 168]

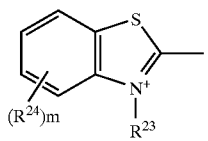

[Chemical Formula 169]

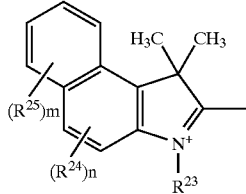

[Chemical Formula 170]

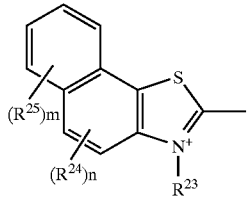

[Chemical Formula 171]

(In Chemical Formulae 168 to 172, $R^{23}$ represents an alkyl group, an alkoxy group and an aryl group. When a molecule contains a plurality of $R^{23}$, the $R^{23}$ may be identical substituents or different substituents from one another. Moreover, $R^{24}$ and $R^{25}$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^{24}$ or $R^{25}$, the $R^{24}$ and the $R^{25}$ may be either identical substituents or different substitutes from one another. The n is 1 or 2; and m is 1, 2, 3, or 4.)

Pigment compound i:

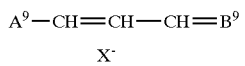

(wherein X— represents Br—, I—, $ClO_4$—, $BF_4$—, $PF_6$—, and $SbF_6$—. Moreover, $A^9$ is an atomic group expressed by Chemical Formulae 173 to 179, and $B^9$ is an atomic group expressed by Chemical Formula 180 and 181.)

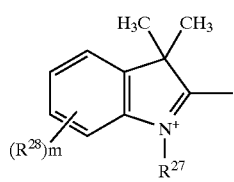

[Chemical Formula 173]

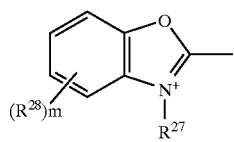

(Chemical Formula 174)

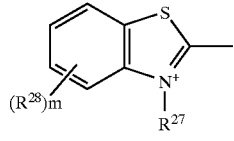

(Chemical Formula 175)

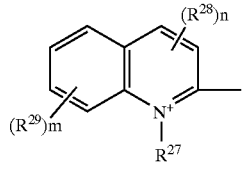

(Chemical Formula 176)

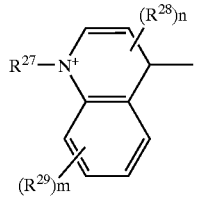

(Chemical Formula 177)

-continued

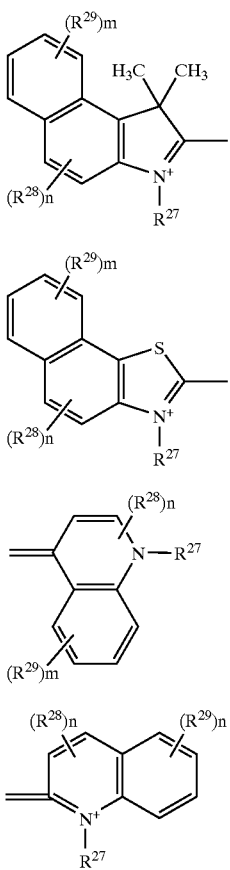

(In Chemical Formulae 168 to 172, $R^{27}$ represents any of an alkyl group, an alkoxy group and an aryl group. When a molecule contains a plurality of $R^{27}$, the $R^{27}$ may be identical substituents or different substituents from one another. Moreover, $R^{28}$ and $R^{29}$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^{28}$ or $R^{29}$, the $R^{28}$ or the $R^{29}$ may be either identical substituents or different substitutes from one another. The n is 1 or 2; and m is 1, 2, 3, or 4.)

Pigment compound j:

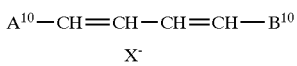

(wherein X— represents Br—, I—, $ClO_4$—, $BF_4$—, $PF_6$—, and $SbF_6$—. Moreover, $A^{10}$ is an atomic group expressed by Chemical Formulae 182 to 188, and $B^{10}$ is an atomic group expressed by Chemical Formula 189 and 190.)

[Chemical Formula 182]

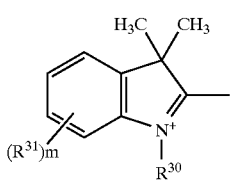

[Chemical Formula 183]
[Chemical Formula 184]
[Chemical Formula 185]
[Chemical Formula 186]
[Chemical Formula 187]
[Chemical Formula 188]
[Chemical Formula 189]
[Chemical Formula 190]

(In Chemical Formulae 182 to 190, $R^{30}$ represents any of an alkyl group, an alkoxy group and an aryl group. When a molecule contains a plurality of $R^{30}$, the $R^{30}$ may be identical substituents or different substituents from one another. Moreover, $R^{31}$ and $R^{32}$ are hydrogen atoms, alkyl group, alkoxy group, amino group, nitro group, cyano group, aryl group, alkoxycarbonyl group, sulfonylalkyl group, and halogen atoms. When a molecule contains a plurality of $R^{31}$ or $R^{32}$, the $R^{31}$ or the $R^{32}$ may be either identical substituents or different substitutes from one another. The n is 1 or 2; and m is 1, 2, 3, or 4.)

Other objects and advantages of the present invention will become apparent from reading the following detailed description and appended claims, and upon reference to the accompanying drawings.

BRIEF DESCRIPTION OF DRAWINGS

FIG. 2 is a plot showing an optical absorption spectrum of a pigment compound a.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Hereinafter, description will be directed to embodiments of the present invention with reference to the drawings.

Hereinafter, description will be directed to embodiments of the present invention.

Figure 1:
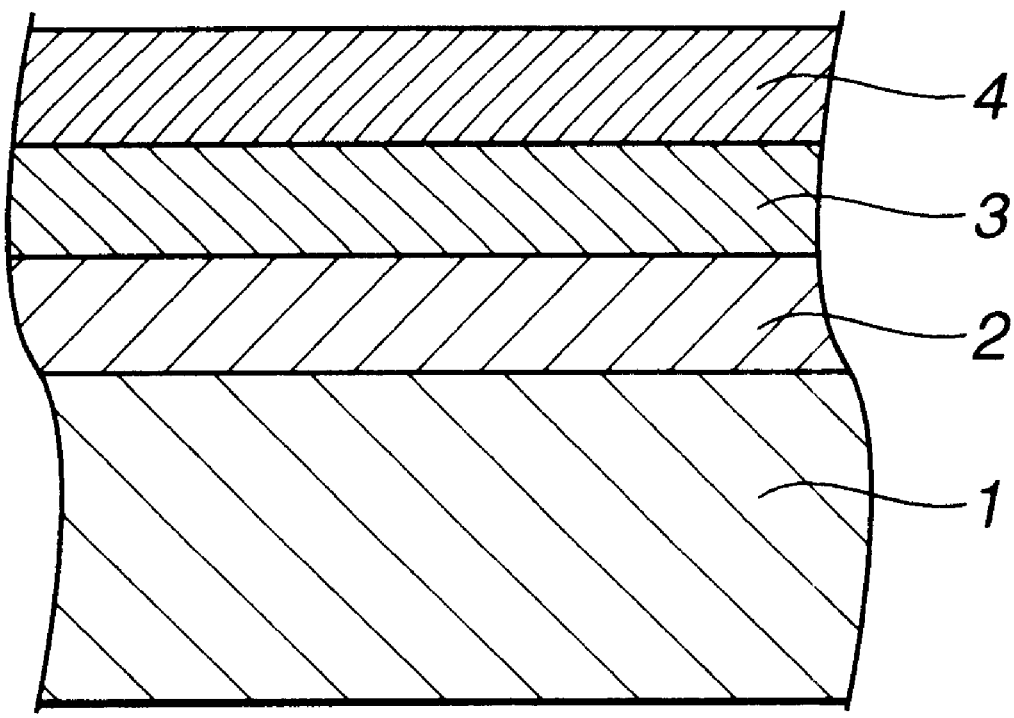
FIG. 1 is a cross sectional view showing an essential portion of an optical recording medium according to an embodiment of the present invention.

FIG. 1 shows an optical recording medium according to the present invention including a light transmitting substrate 1 on which a recording layer 2, a reflection layer 3, and a protection layer 4 are successively formed.

The recording layer 2 contains an organic pigment as a recording material. When a laser beam is radiated onto this recording layer 2, the organic pigment absorbs the light and heat is generated so as to dissolve the pigment. Because of this dissolution of the pigment, the reflection ratio is locally changed, thus recording an information signal.

According to the present invention, this recording layer 2 contains an organic pigment which is a tri-methine pigment compound a, b, or c having a predetermined aromatic ring at both ends. These tri-methine pigments enable to obtain a high reflection ratio and an appropriate optical absorption in the wavelength band of 630 nm to 650 nm and has a small wavelength dependency in this wavelength band, enabling to obtain a stable optical characteristic. Consequently, the optical recording medium using these tri-methine pigments as a recording material enables to obtain a high recording sensitivity and a signal modulation degree in the wavelength band of 630 nm to 650 nm.

Each of these tri-methine pigments can be used solely or in combination. By combining a plurality of types, it is possible to adjust the optical absorption and the reflection ratio in the range of 630 nm to 650 nm.

Moreover, each of these tri-methine pigments may be mixed with a pigment compound d (mono-methine pigment having a predetermined aromatic ring at both ends), a pigment compound e (di-methine pigment having a predetermined aromatic ring at both ends), and a pigment compound f (tri-methine pigment having a predetermined aromatic ring at both ends). Each of the pigment compounds d, e, and f having no absorption in the wavelength band of 630 nm to 650 nm cannot be used solely as a recording material, but can be used as a recording material if mixed with other pigment compounds such as the pigment compounds a, b, and c. Thus, by constituting the recording layer 2 with a plurality of pigment compounds in combination, it is possible to obtain a preferable optical absorption and reflection ratio in the range of 630 nm to 650 nm.

In addition to this, as the organic pigment used for the recording layer 2 may be selected from the following: a pigment compound g (mono-methine pigment having a predetermined aromatic ring at both ends), a pigment compound h (di-methine pigment having a predetermined aromatic ring at both ends), a pigment compound i (tri-methine pigment having a predetermined aromatic ring at both ends), and a pigment compound j (tetra-methine pigment having a predetermined aromatic ring at both ends). Each of these pigment compounds g, h, i, and j can be used in combination with other pigment compounds, so as to reduce the wavelength dependency of the reflection ratio in the range from 630 to 650 nm. Consequently, here, each of the pigment compounds g, h, i, and j is to be used not solely but in combination with other compound(d) as a mixture. For this mixture, it is possible to select two or more from the pigment compounds g, h, i, and j; or to combine the pigment compounds g to j with the pigment compounds a to c; or to combine the pigment compounds g to j with the pigment compounds d to f; or to combine the pigment compounds g to j with the pigment compounds a to c and the pigment compounds d to f. Here, the semiconductor laser used for recording and reproduction of the optical recording medium, has an oscillation wavelength which fluctuates due to fluctuation of production quality or fluctuation of environmental temperature. For this, the reduction in wavelength dependency of the recording layer 2 by mixing the pigment compounds g to j exhibits a great merit to obtain a stable reproduction characteristic.

It should be noted that the aforementioned pigment compounds a to j are shown in Chemical Formulae 191 to 259. Note that Chemical Formulae 191 to 198 (pigments a1 to a8) are examples of the pigment compound a; Chemical formulae 199 to 206 (pigments b1 to b8) are examples of the pigment compound b; Chemical Formulae 207 to 213 (pigments c1 to c7) are examples of the pigment compound c; Chemical Formulae 214 and 215 (pigments d1 and d2) are examples of the pigment compound d; Chemical Formulae 216 to 220 (pigments e1 to e5) are examples of the pigment compound e; Chemical Formulae 221 to 229 (pigments f1 to f9) are examples of the pigment compound f; Chemical Formula 230 (pigment g1) is an example of the pigment compound g; Chemical Formulae 231 to 234 (pigments h1 to h4) are examples of the pigment compound h; Chemical Formulae 235 to 247 (pigments i1 to i13) are examples of the pigment compound i; and Chemical Formulae 248 to 259 (pigments j1 to j12) are examples of the pigment compound j. It should be noted that among these pigments, the pigment a8 has a special merit that it can be solved with a high concentration of 20 weight/volume % or above in a solvent, which enables to easily adjust the pigment solution.

[Chemical Formula 191]

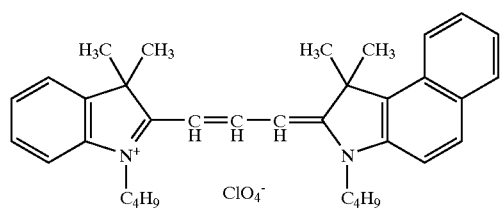

a1

[Chemical Formula 192]

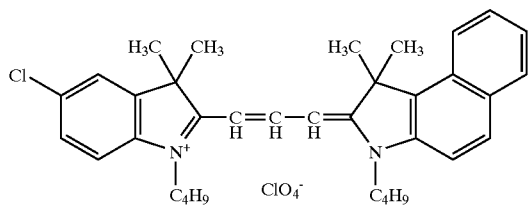

a2

[Chemical Formula 193]

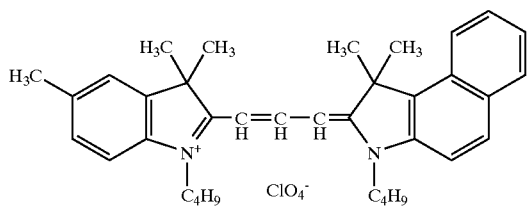

a3

[Chemical Formula 194]

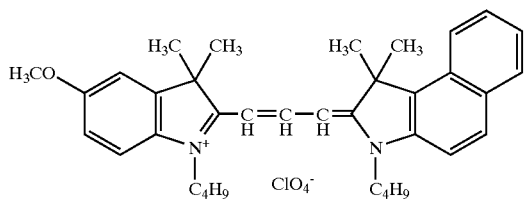

a4

[Chemical Formula 195]

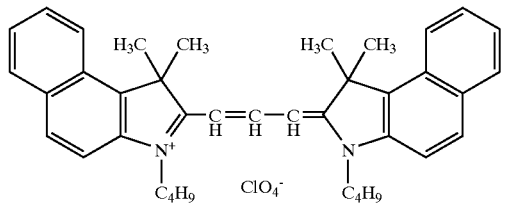

a5

[Chemical Formula 196]

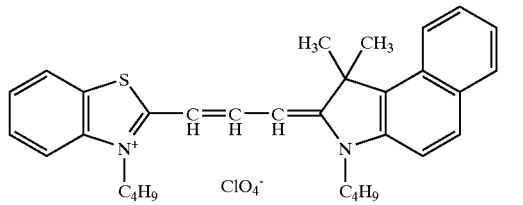

a6

[Chemical Formula 197]

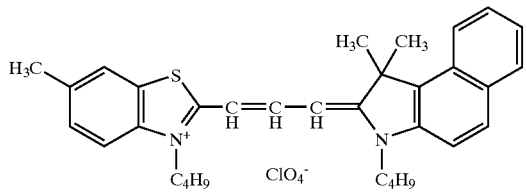

a7

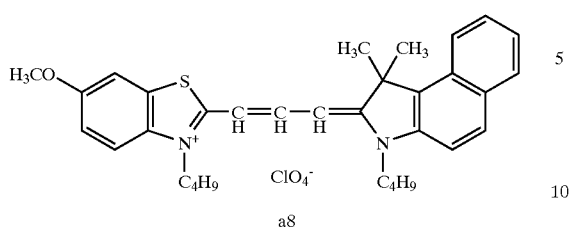
a8
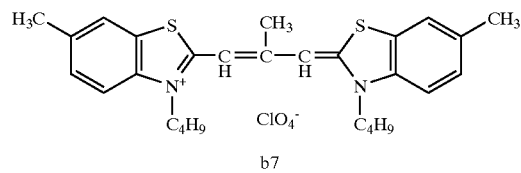
b7
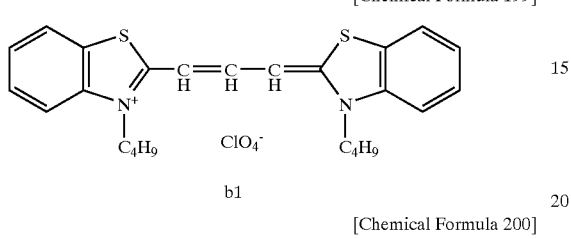
b1
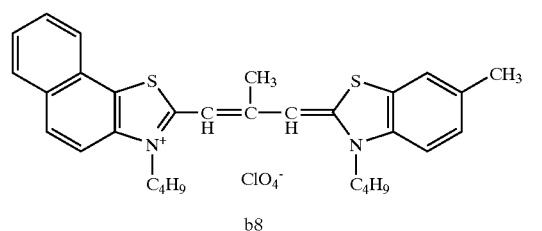
b8
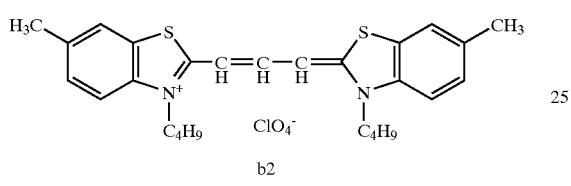
b2
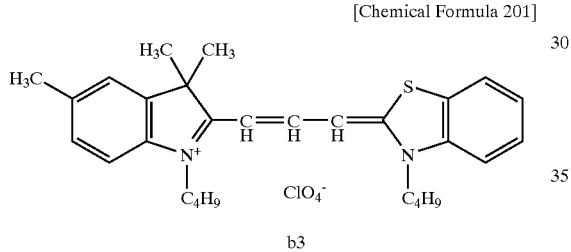
b3
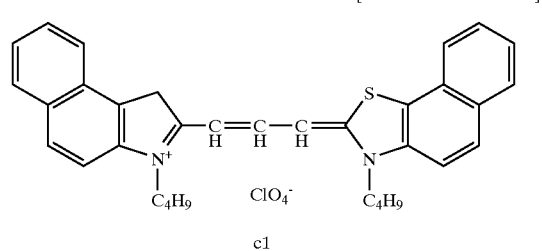
c1
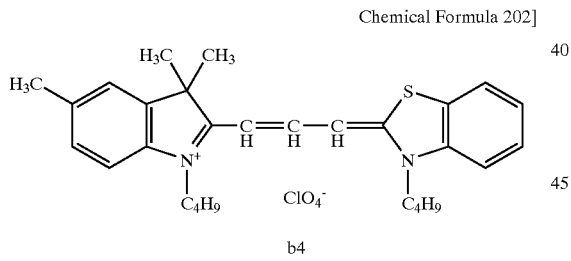
b4
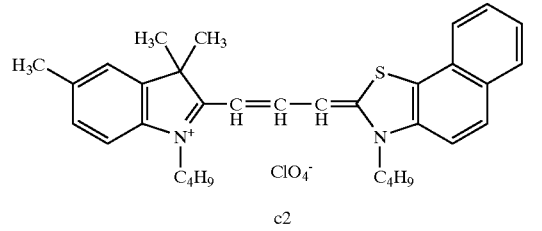
c2
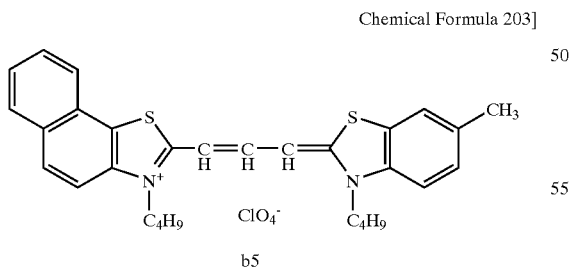
b5
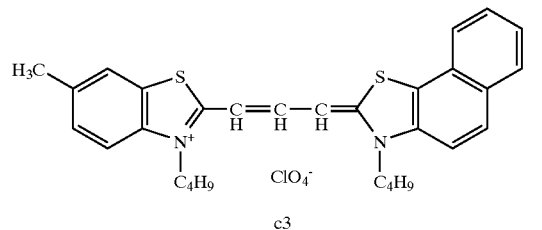
c3
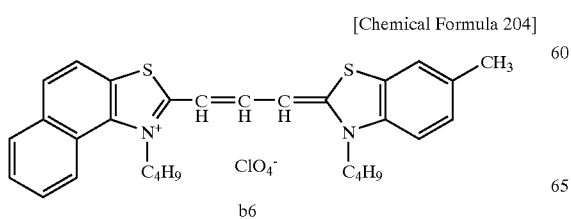
b6
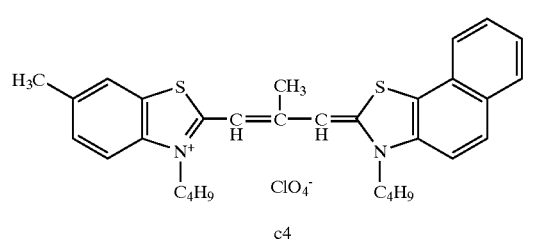
c4

[Chemical Formula 211]
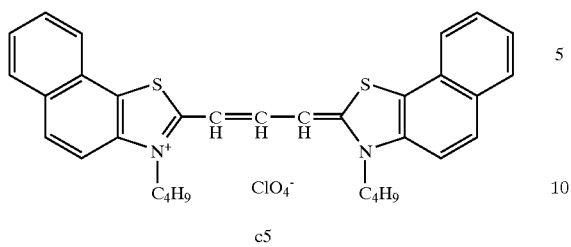
c5
[Chemical Formula 212]
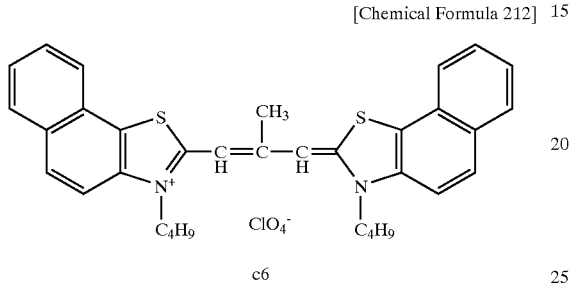
c6
[Chemical Formula 213]
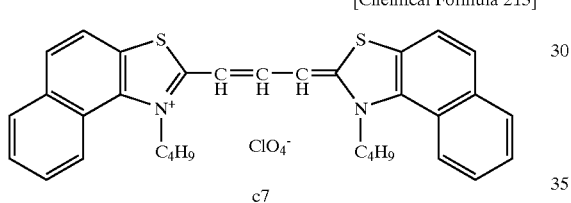
c7
[Chemical Formula 214]
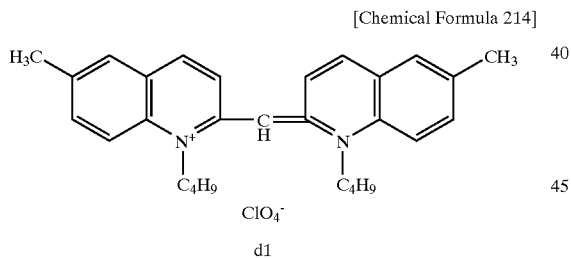
d1
[Chemical Formula 215]
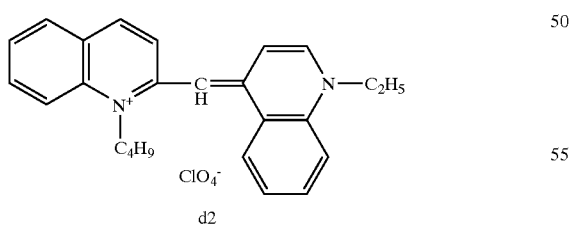
d2
[Chemical Formula 216]
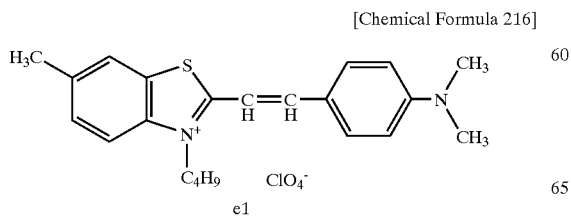
e1
[Chemical Formula 217]
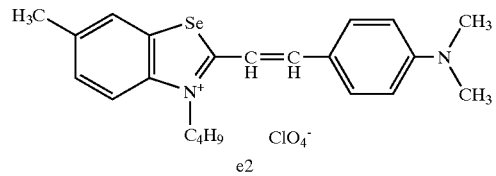
e2
[Chemical Formula 218]
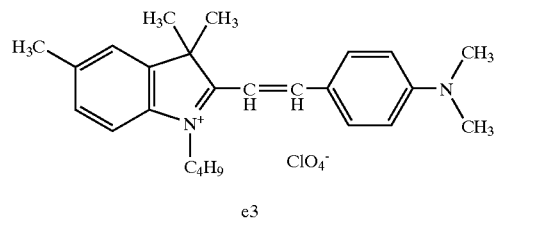
e3
[Chemical Formula 219]
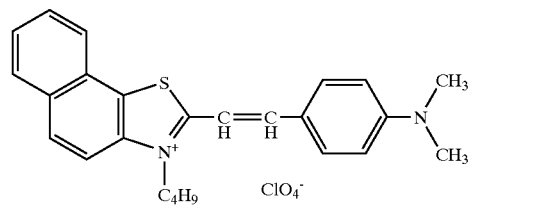
e4
[Chemical Formula 220]
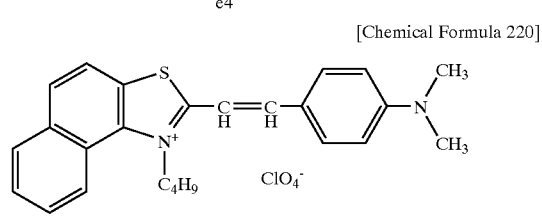
e5
[Chemical Formula 221]
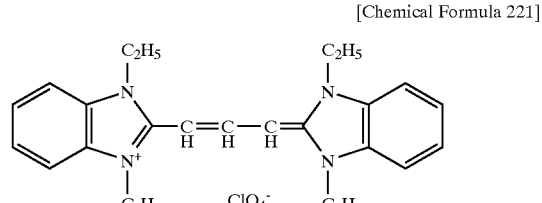
f1
[Chemical Formula 222]
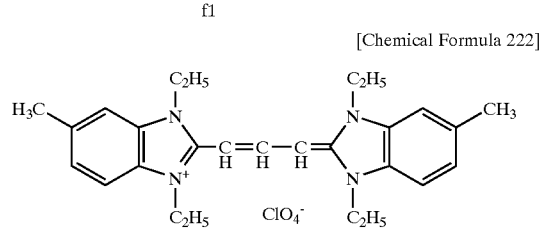
f2
[Chemical Formula 223]
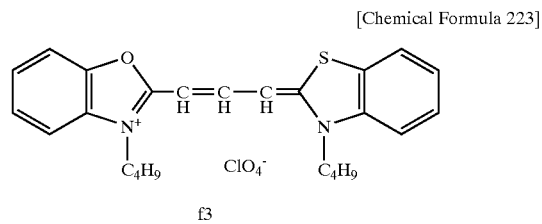
f3

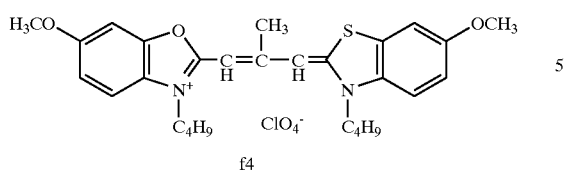
f4
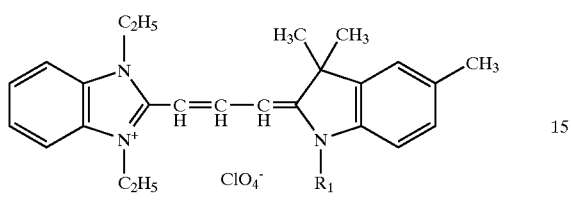
f5
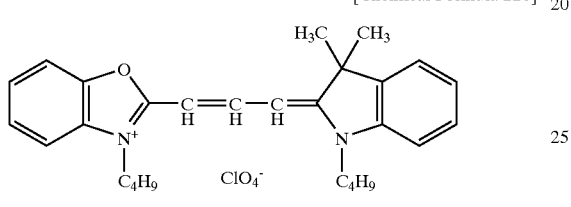
f6
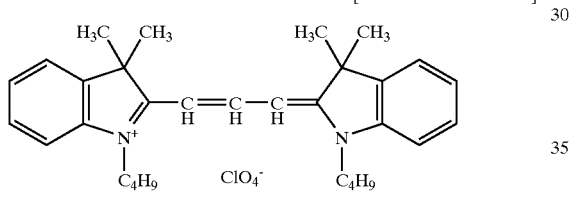
f7
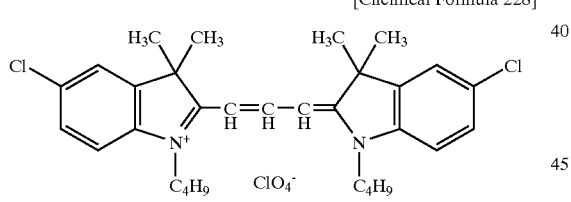
f8
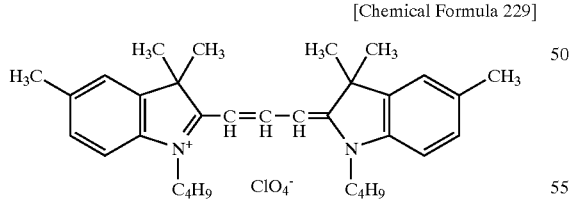
f9
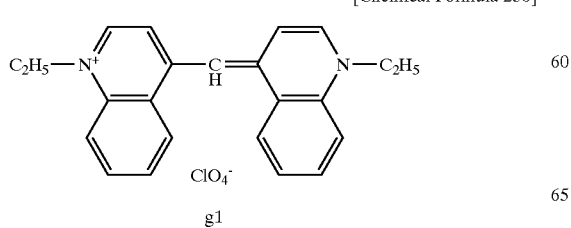
g1
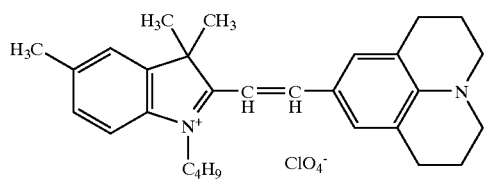
h1
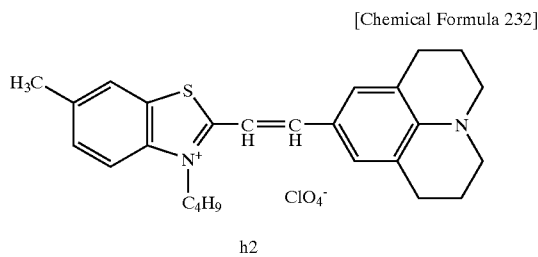
h2
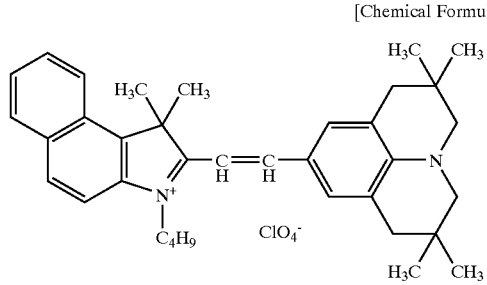
h3
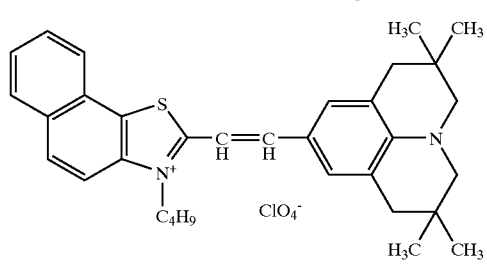
h4
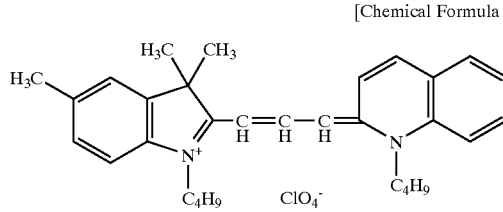
i1
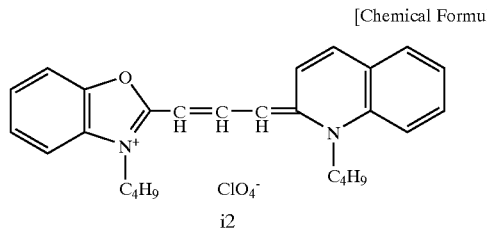
i2

23

-continued

[Chemical Formula 237]

i3

[Chemical Formula 238]

i4

[Chemical Formula 239]

i5

[Chemical Formula 240]

i6

[Chemical Formula 241]

i7

[Chemical Formula 242]

i8

24

-continued

[Chemical Formula 243]

i9

[Chemical Formula 244]

i10

[Chemical Formula 245]

i11

[Chemical Formula 246]

i12

[Chemical Formula 247]

i13

[Chemical Formula 248]

j1

-continued

[Chemical Formula 249]

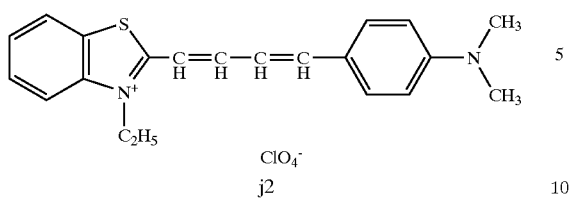

j2

[Chemical Formula 250]

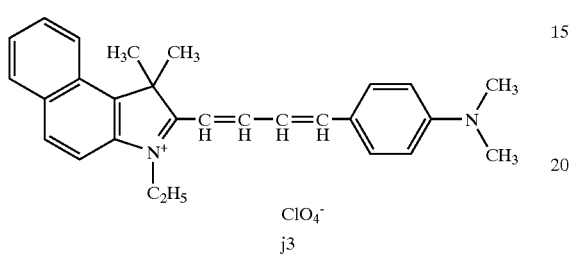

j3

[Chemical Formula 251]

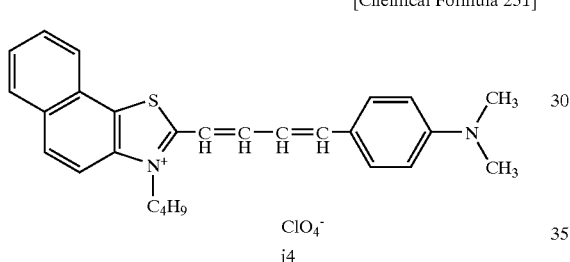

j4

[Chemical Formula 252]

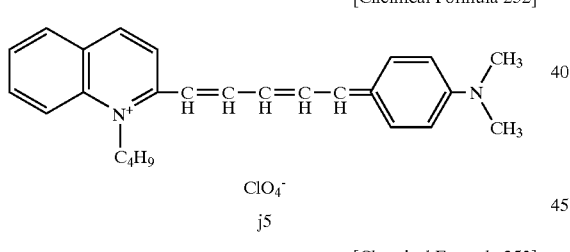

j5

[Chemical Formula 253]

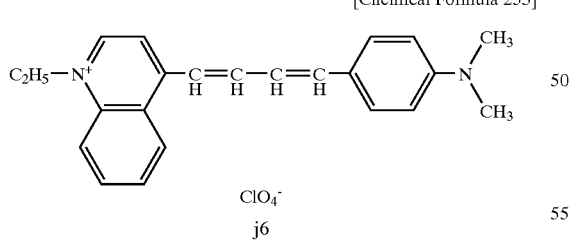

j6

[Chemical Formula 254]

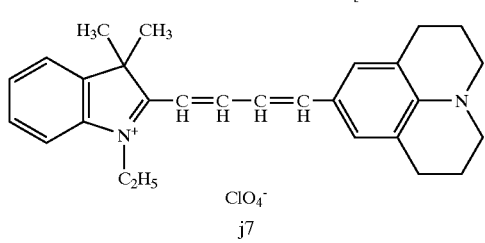

j7

-continued

[Chemical Formula 255]

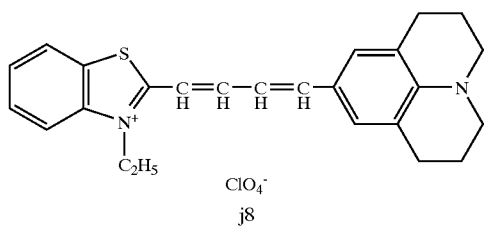

j8

[Chemical Formula 256]

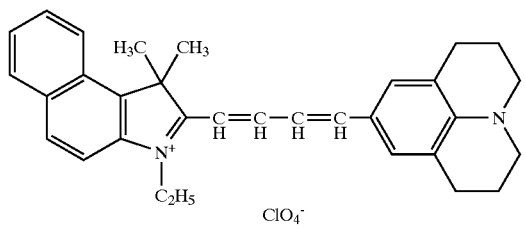

j9

[Chemical Formula 257]

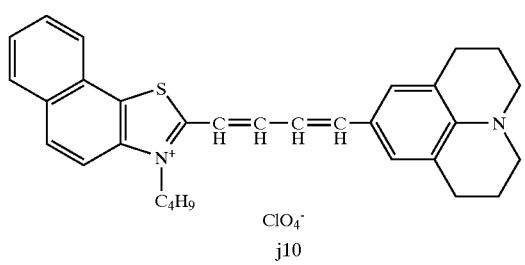

j10

[Chemical Formula 258]

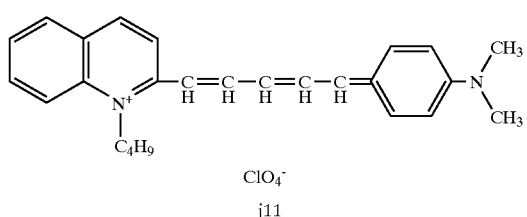

j11

[Chemical Formula 259]

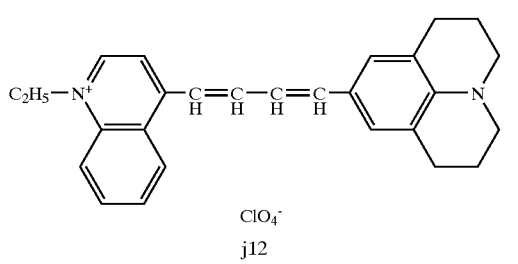

j12

The recording layer 2 is made by using the aforementioned organic pigments as the recording material. Furthermore, as an additive, it is possible to add a chemical substance (deactivating agent) for deactivating a singlet oxygen. As such a chemical substance, there can be exemplified a nickel metal complex compound, copper complex compound, hindered amine compound, aromatic amine compound, aromatic immonium chloride compound, and the like. By using these deactivating agent, it is possible to prevent optical deterioration of the recording layer 2.

As has been described above, the recording layer 2 is formed by using an organic pigment with addition of a deactivating agent, if necessary, solved in an organic solvent so as to prepare a pigment paint which is applied, for example, by way of the spin coat method onto the transparent substrate 1 and dried.

As the solvent for preparing this paint, it is preferable to select a solvent in which the organic pigments and the deactivating agents can be solved with a high dissolution and which will not cause swelling or dissolution of the substrate 1.

For example, the following are appropriate as the solvent: diacetone alcohol, 3-hydroxy-3-methyl-2-butanone, ethylene glycol monomethyl ether, ethylene glycol monoethyl ether, propylene glycol monomethyl ether, propylene glycol monoethyl ether, cyclohexanon, chloroform, 2,3,3,3-tetrafluoro-1-propanol, and the like.

The recording layer 2 preferably has a thickness of 50 to 1000 nm. If the recording layer 2 has a thickness smaller than this range, the heat generated in the recording layer 2 by a laser beam easily reaches the reflection layer 3 and it is impossible to use the laser beam effectively for information recording. Moreover, if the recording layer 2 has a thickness above 1000 nm, the volume in the recording layer through which the laser beam passes is increased and the temperature increase per laser power is decreased. Thus, it becomes difficult to generate an optical change sufficient for information recording.

In the optical recording medium according to the present invention, the recording layer 2 is made by using the aforementioned materials. However, the optical recording medium may have a configuration other than this which is normally used in this type of optical recording medium.

Firstly, the transparent substrate 1 is formed in a disc shape and has a tracking groove or pit formed in a concave-convex configuration on a surface which is brought into contact with the recording layer 2.

As the substrate material, a high molecular material is used such as a polymethacryl resin, polycarbonate resin, polyolefin resin, and the like. These high molecular materials are formed into a substrate shape by way of, for example, injection molding or extrusion molding. Moreover, as the transparent substrate 1, it is also possible to use a glass substrate on which a groove or pit is formed by way of the 2P method (photo-polymer method). It should be noted that an intermediate layer may be formed on the surface of the transparent substrate 1 on which the recording layer 2 is to be formed, for the purpose of protecting the transparent substrate 1 from the pigment paint solvent.

The aforementioned reflection layer 3 is made from a metal such as gold, silver, copper, aluminium, and the like. Each of these metals may be used solely or in combination. The reflection layer 3, for example, is formed by a thin film formation technique such as vacuum deposition, sputtering, ion plating, and the like.

On the optical reflection layer 3 is formed a protection layer 4 which is additionally provided for protecting the recording layer 2 and the reflection layer 3 from corrosive factors and shocks from an external environment.

The protection layer 4 need not be optically transparent and can be made from, for example, an ultraviolet-hardening resin applied by way of spin coating method and hardened by ultraviolet radiation so as to obtain an ultraviolet hardened resin film. Alternatively, it is also possible to use as the material of the protection layer 4, fluororesin, silicon resin, acryl resin, urethane resin, and the like. Moreover, the protection layer 4 may contain various additives or filler so as to improve the viscosity, shrinkage property, anti-humidity property, and the like.

Moreover, the aforementioned optical recording medium is a single-plate type configuration having a single transparent substrate 1 on which the recording layer 2, an optical absorption layer, and the like are formed. However, the optical recording medium according to the present invention may be a double-plate type having a substrate bonded to a single-plate configuration.

The substrate to be bonded may be a single-plate type disc having a transparent substrate on which a recording layer, a protection layer, and the like are formed. The recording layer may be a recording layer using an organic pigment as a recording material, a metal reflection layer (reproduction-dedicated recording layer) on which an information signal is recorded in advance through a convex-concave pattern. The recording layer may be other than this. Note that in a case of using an organic pigment as the recording material, there should be provided an optical absorption layer as has been described above.

For bonding such a single-plate type disc, the protection layer of a disc can be bonded to the protection layer of the other disc by using an adhesive or both-sided adhesive tape. It should be noted that the adhesive agent used for this bonding may also have the function of the protection layer, omitting the protection layer of the single-plate disc.

Moreover, the substrate to be bonded may be a substrate not contributing to optical information recording, i.e., a substrate not having a recording layer formed. In this case, the substrate need not be optically transparent and may have a trademark printed or have a surface on which letters and the like can be written by a writing tool.

Furthermore, the optical recording medium according to the present invention may have the air-sandwich configuration in which two single-plate discs each having a recording layer of an organic pigment are bonded in such a manner that the recording layers oppose to each other through an air layer.

Next, the following study has been made in order to confirm the effects of the present invention.

PREPARATORY EXPERIMENT 1-1

Examination of Pigment Compound a

As the pigment compound a, we have prepared pigments a1 to a6. In order to check the absorption spectrum of these pigments, each of the pigments was solved in tetrafluoro-propanol to obtain a pigment solution of 3.0 weight/volume %. It should be noted that when the dissolution speed of a pigment was too slow, an ultrasonic washer and a slow mill were used to dissolve the pigment completely.

Each of these pigment solutions obtained is applied onto a glass plate of 3 cm×3 cm by way of spin coat method and dried to form a pigment layer and its absorption spectrum was observed. The pigments a1 to a6 respectively had the absorption spectra shown in FIG. 2. It should be noted that these absorption spectra are normalized at the maximum absorption of the spectra observed.

Figure 2:
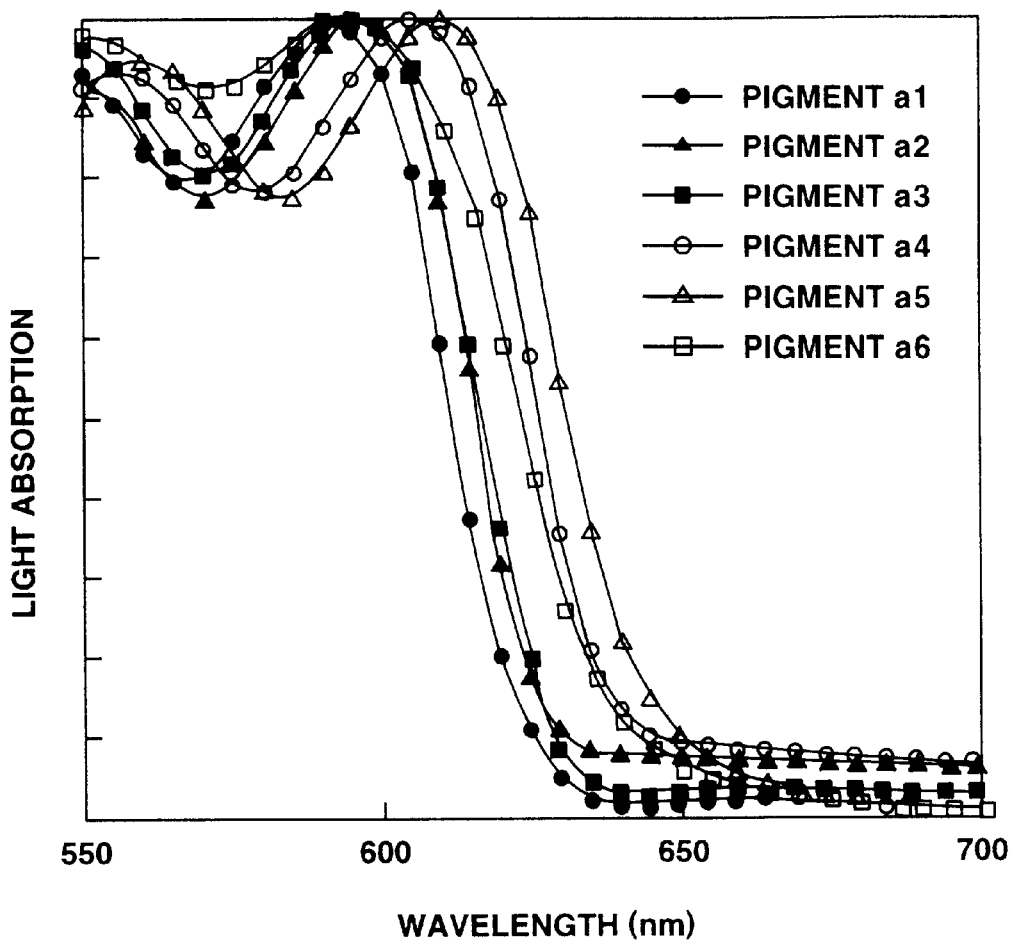

FIG. 2 shows that the absorption end is shifted to the long wavelength side in the order of the pigment a1, pigment a2, pigment a3, pigment a4, and pigment a5, and the absorption at 640 nm is increased. This shift of the absorption end to the long wavelength side is caused of spread of $\pi$ electron in the indoline part.

EXAMPLE 1-1

Each of the pigment a4, pigment a5, and pigment a6 was used solely as a recording material to prepare an optical disc as follows.

Firstly, each of the pigments a4, a5, and a6 was dissolved in tetrafluoropropanol to obtain a pigment solution. Note that the concentration of the pigment solution was adjusted so a reflection layer formed layer has a reflection ratio of 50% at the wavelength of 640 nm.

On the other hand, we prepared a polycarbonate disc substrate having a thickness of 0.6 mm and an outer diameter of 120 mm. Note that a guide groove is formed at an interval of 0.8 μm on one side of this disc for tracking of a laser beam during recording.

On this substrate was formed a recording layer by applying a pigment solution by way of spin coat method. It should be noted that a computer was used for quantity control of the pigment solution to be applied and control of the application sequence.

Firstly, the disc was placed with its side having the guide groove upward and with its opposite side chucked on an air suction type chucking table.

While the disc substrate was rotated at 300 rpm, the pigment solution was applied starting at a position slightly out of the outermost circumference of the guide groove toward the innermost circumference of the guide groove. Next, the rotation of the disc substrate was increased to 1500 rpm so as to remove an excess amount of the pigment solution. After this, the rotation was temporarily lowered to 500 rpm and then increased for 15 seconds up to 2000 rpm.

As a result, the pigment solution was spread over the entire disc substrate surface, which was dried to form a recording layer. Note that the thickness of the recording layer formed was determined by measuring the optical concentration: the center film thickness was 100 nm and the thickness deviation was within 10%.

Next, a reflection layer with a thickness of 100 nm was formed on the recording layer by using a resistance heating type vacuum deposition apparatus.

When forming the reflection layer, the portions inside and outside of the area having the guide area were shaded, so that the reflection layer was formed only on the area having the guide groove. Moreover, in order to obtain a uniform thickness, the deposition was carried out while rotating the substrate. The vacuum degree during the deposition was 10−6 Torr and the deposition speed and thickness were controlled by using a quartz oscillation film thickness meter.

Next, a protection layer was formed by applying an ultraviolet-ray hardening resin (trade name Kayarad OVD-005 produced by Nihon Kayaku Co., Ltd.) onto the reflection layer by way of spin coat method. The spin coat method was carried out as follows.

Firstly, the disc substrate was placed with its surface having the guide groove upward and a rear surface portion corresponding to inside of the guide groove chucked by an air suction type chucking table.

While the disc substrate was rotated at 300 rpm, the ultraviolet-ray hardening resin was applied starting at a position slightly outside of the outermost circumference of the guide groove toward the innermost circumference of the guide groove. Subsequently, the rotation of the disc substrate was increased to 1500 rpm so as to remove an excess quantity of the ultraviolet-ray hardening resin.

As a result, the ultraviolet-ray hardening resin was applied over the entire surface of the disc substrate. It should be noted that for radiation of ultraviolet rays, we used a mercury lamp of 80W/cm straight pipe type. By this, the ultraviolet-ray hardening resin was hardened by 5 seconds of radiation.

On the protection layer thus formed, a double-sided adhesive film was adhered to bond the polycarbonate substrate of 0.6 mm thickness, thus obtaining an optical disc.

Figure 3:
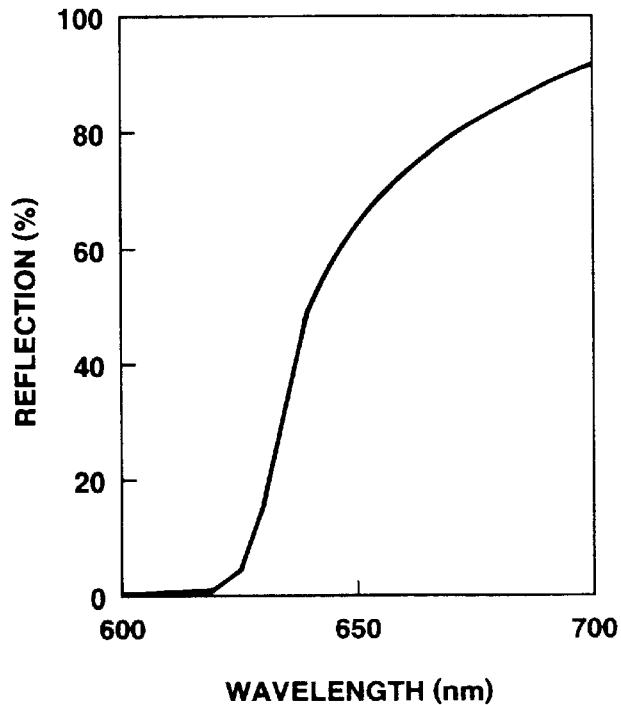
FIG. 3 shows a characteristic of an optical reflection spectrum of an optical recording medium using a pigment a4.
Figure 4:
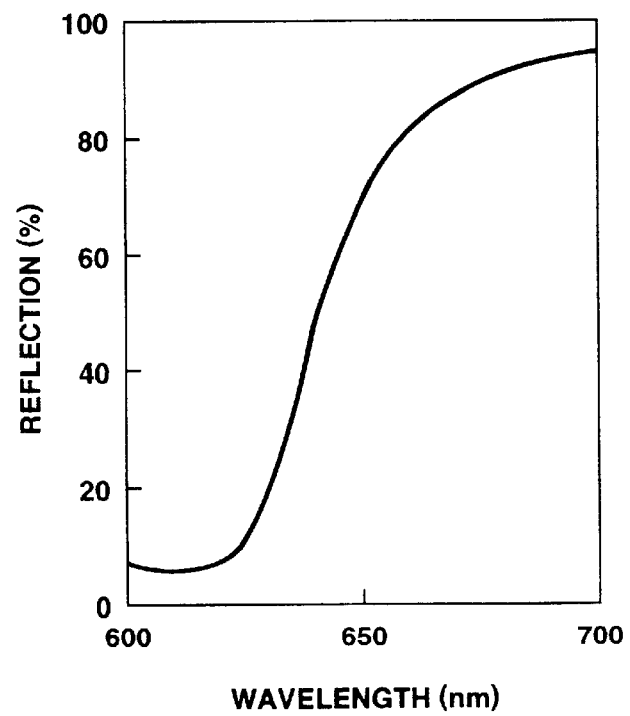
FIG. 4 shows a characteristic of an optical reflection spectrum of an optical recording medium using a pigment a5.
Figure 5:
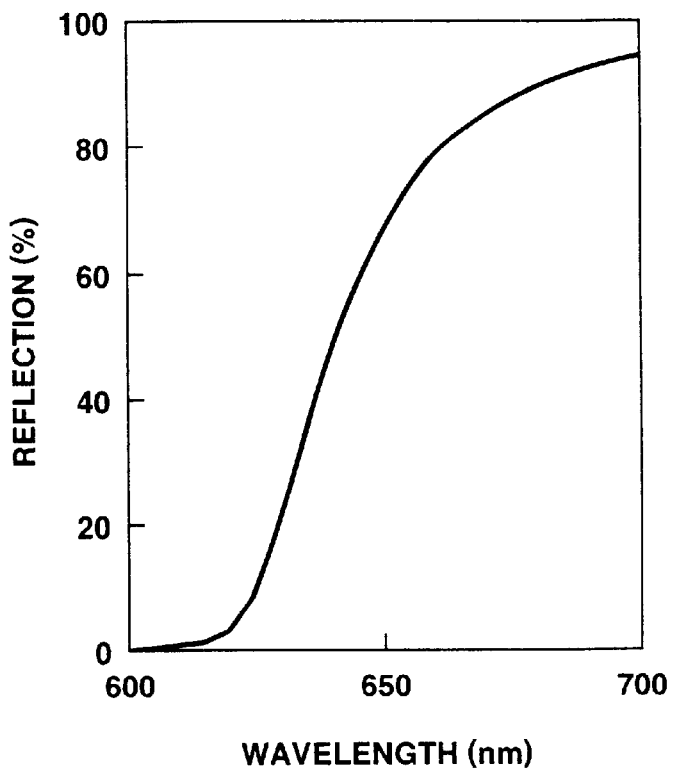
FIG. 5 shows a characteristic of an optical reflection spectrum of an optical recording medium using a pigment a6.

The optical discs prepared had the optical reflection spectra shown in FIG. 3, FIG. 4, and FIG. 5. It should be noted that FIG. 3 shows the optical reflection spectrum of the optical disc prepared by using the pigment a4; FIG. 4 shows the optical reflection spectrum of the optical disc prepared by using the pigment a5; and FIG. 5 shows the optical reflection spectrum of the optical disc prepared by using the pigment a5. Thus, for all of these optical discs, it was possible to obtain a reflection ratio of about 50% in the wavelength of 640 nm.

Next, for these optical discs, a recording test was carried out by using a red semiconductor laser of 640 nm as a light source. Note that this recording test was carried out under the following conditions.

Figure 6:
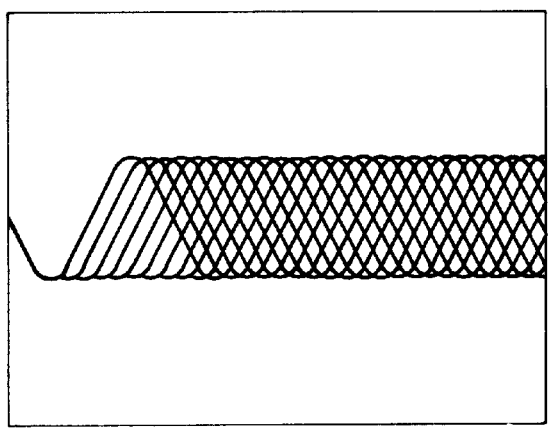
FIG. 6 shows a signal reproduction waveform of an optical recording medium using the pigment a4.

Recording/reproduction layer:
  Red semiconductor laser of 640 nm
  Objective lens numerical aperture: 0.6
  Linear velocity: 1.8 m/second
  Recording signal: EFM+signal
  Shortest bit length: 0.3 μm Under these conditions, the recording operation was carried out while increasing the laser power step by step. In the case of the optical disc using the pigment a4, the recording was actually started with a laser power of about 6.5 mW. The signal modulation was increased as the laser power increased. With the laser power of 12 mW, it was possible to obtain signal modulation of 60% or above. For reference, FIG. 6 shows an eye pattern obtained when a signal was reproduced with the laser power of 12 mW.

Almost similarly, in the case of the optical disc using the pigment a5, recording was actually started with the laser power of about 6.0 mW. The signal modulation was increased as the laser power increased, and with the laser power of 11 mW, it was possible to obtain signal modulation of 60% or above.

In the case of the optical disc using the pigment a6, recording was actually started with the laser power of about 6.5 mW. The signal modulation increased as the laser power increased and with the laser power of 10 mW, it was possible to obtain signal modulation of 60% or above.

Furthermore, for each of the optical disc using the pigment a4, the optical disc using the pigment a5, and the optical disc using the pigment a6, reproduction was carried out with the wavelength of 650 nm. Similarly in the case of 640 nm, it was possible to obtain a preferable reproduction signal.

From the aforementioned, it can be understood that in the optical discs using the pigment a4, the pigment a5, and the pigment a6 as the recording material, it is possible to carry out recording and reproduction with 640 nm and that the wavelength dependency is small in the vicinity of 640 nm, enabling to obtain a stable reproduction.

It should be noted that the identical test with the wavelength of 640 nm was carried out for the optical discs using the pigments a1, a2, a3, the pigment a7, and the pigment a8 as the recording material. In each of these optical discs, recording was actually started with a laser power of 6.0 to 6.5 mW and signal modulation of 60% or above was obtained with a laser power of about 11 mW. Moreover, reproduction with a wavelength of 650 nm resulted in similar reproduction characteristics.

EXAMPLE 1-2

Among the pigment compounds a, a mixture of pigments a1 and a2 and a mixture of pigment a3 and a5 were respectively used as the recording material to prepare optical discs as follows.

The pigment a1 and the pigment a2 were mixed with weight ratio of 1:3 and dissolved in a tetrafluoropropanol to obtain a pigment solution. The pigment a3 and the pigment a5 were mixed with weight ratio of 5:1 and dissolved in tetrafluoropropanol to obtain a pigment solution. The concentration of the pigment solutions was adjusted so that a reflection layer formed enables to obtain a reflection ratio of 50% at 640 nm.

These solutions were used to prepare optical discs in the same way as in Example 1.

Figure 7:
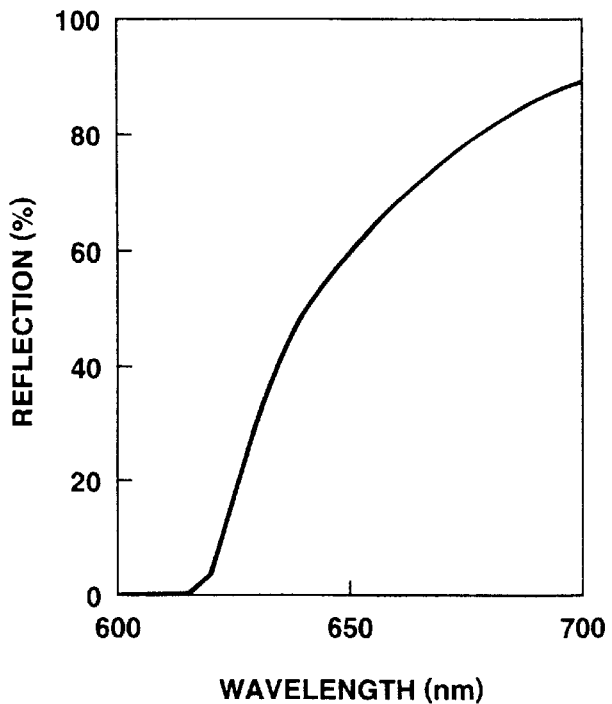
FIG. 7 shows a characteristic of an optical reflection spectrum of an optical recording medium using a mixture of pigments a1 and a2.
Figure 8:
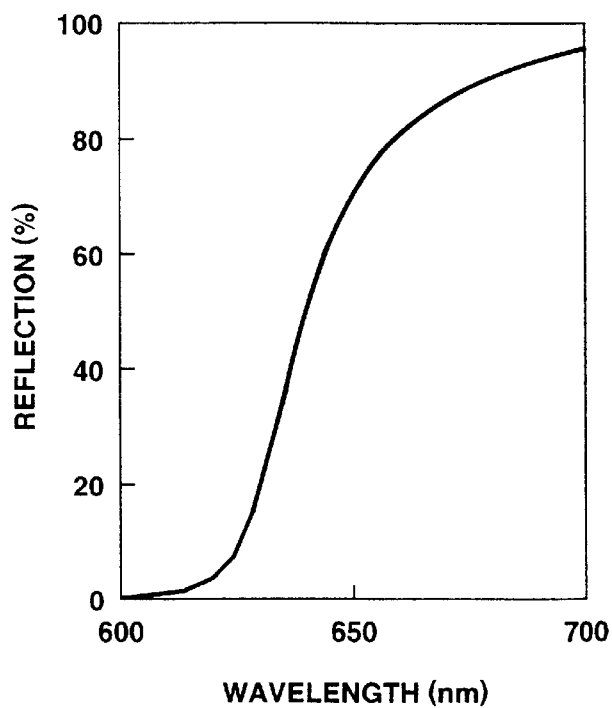
FIG. 8 shows a characteristic of an optical reflection spectrum of an optical recording medium using a mixture of pigments a3 and a5.

The optical discs prepared had optical reflection spectra shown in FIG. 7 and FIG. 8. Note that FIG. 7 shows an optical reflection spectrum of the optical disc prepared using the mixture of the pigments a1 and a2; and FIG. 8 shows an optical reflection spectrum of the optical disc prepared by using the mixture of the pigments a3 and a5. In each of these optical discs, a reflection ratio of about 50% was obtained at wavelength of 640 nm.

Next, a recording test was carried out for each of these optical discs by using the red semiconductor laser of 640 nm under the same conditions as Example 1.

As a result, in the optical disc using the mixture of the pigments a1 and a2, recording was actually started with a laser power of about 6.5 mW. The signal modulation increased as the laser power increased and with a laser power of 12 mW, signal modulation of 60% or above was obtained.

Almost similarly, in the optical disc using the mixture of the pigments a3 and a5, recording was actually started with a laser power of about 6.0 mW. The signal modulation increased as the laser power increased and with a laser power of 10 mw it was possible to obtain signal modulation of 60% or above.

Furthermore, reproduction with a wavelength of 650 nm for each of these optical discs resulted in a preferable reproduction signal like in the recording/reproduction with 640 nm.

As can be understood from the aforementioned, in the optical discs using mixtures of the pigment compounds a, it is possible to obtain recording/reproduction with 640 nm and the wavelength dependency is small in the vicinity of 640 nm, enabling to obtain a stable reproduction.

PREPARATORY EXPERIMENT 2-1

Examination of Pigment Compound b

As the pigment compound b, we have prepared pigments b1 and a2. In order to check the absorption spectrum of these pigments, each of the pigments was solved in tetrafluoropropanol to obtain a pigment solution of 3.0 weight/volume %. It should be noted that when the dissolution speed of a pigment was too slow, an ultrasonic washer and a slow mill were used to dissolve the pigment completely.

Figure 9:
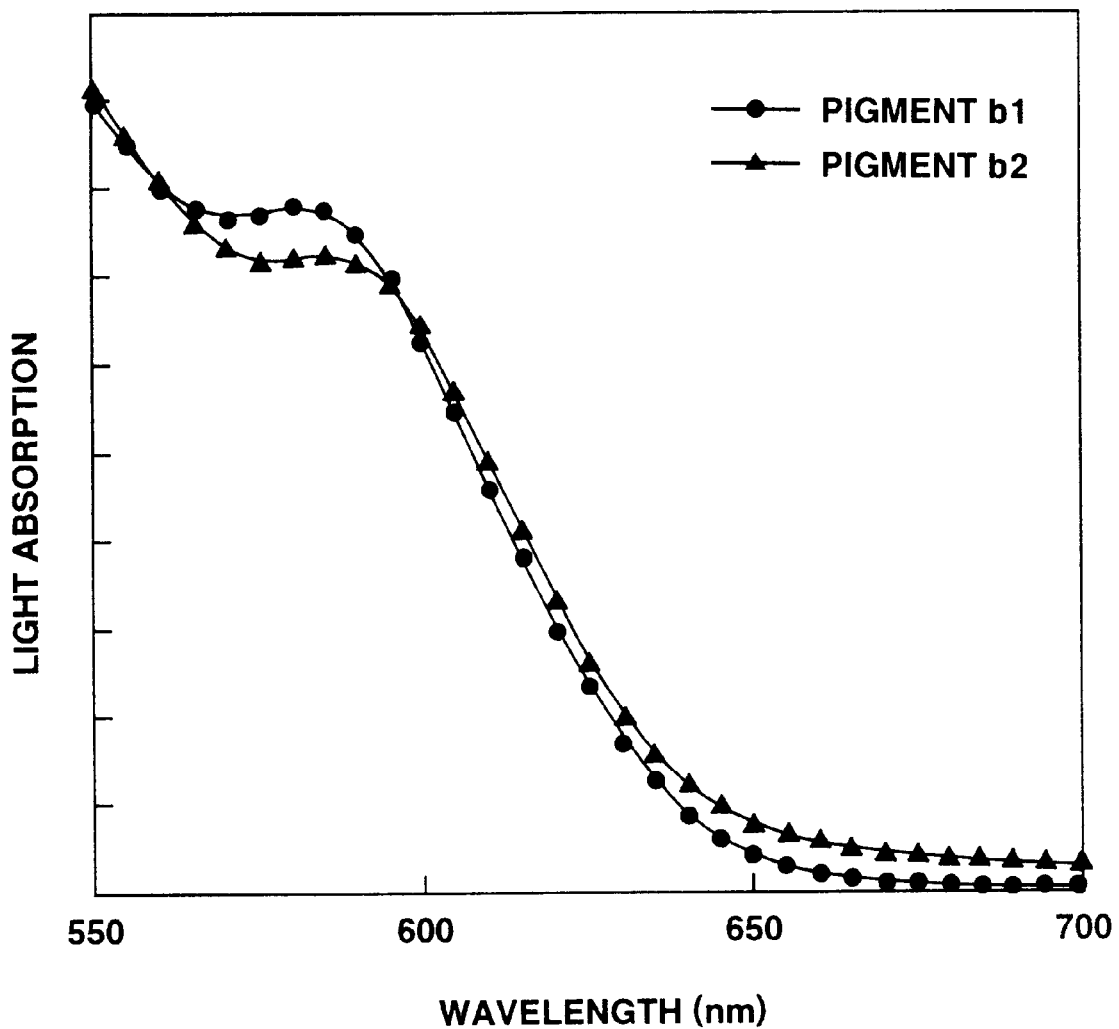
FIG. 9 is a plot showing a characteristic of an optical absorption spectrum of a pigment compound b.

Each of these pigment solutions obtained was applied onto a glass plate of 3 cm×3 cm by way of spin coat method and dried to form a pigment layer and its absorption spectrum was observed. The pigments b1 and b6 respectively had the absorption spectra shown in FIG. 9. It should be noted that these absorption spectra are normalized at the maximum absorption of the spectra observed.

The pigments b1 and b2 are compound having a thiazoline skeleton within a molecule. When compared to the absorption spectra of the pigments a1 and a2 having an indoline skeleton in a molecule shown in FIG. 2, the absorption end at the longer wavelength side decreases moderately. This means that the pigments b1 and b2 are useful as recording materials for recording with a 640 nm red semiconductor laser. It should be noted that in addition to these pigments, we observed absorption spectra of pigments b3 to b8 which also enabled to obtain an absorption spectrum having an absorption end extending to or above 640 nm.

EXAMPLE 2-1

Each of the pigment b1 and pigment b2 was used solely as a recording material to prepare an optical disc as follows.

Each of the pigments b1 and b2 was dissolved in tetrafluoropropanol to obtain a pigment solution. Note that the concentration of the pigment solution was adjusted so a reflection layer formed layer has a reflection ratio of 50% at the wavelength of 640 nm.

These pigment solutions were used to prepare optical discs in the same way as in Example 1.

Figure 10:
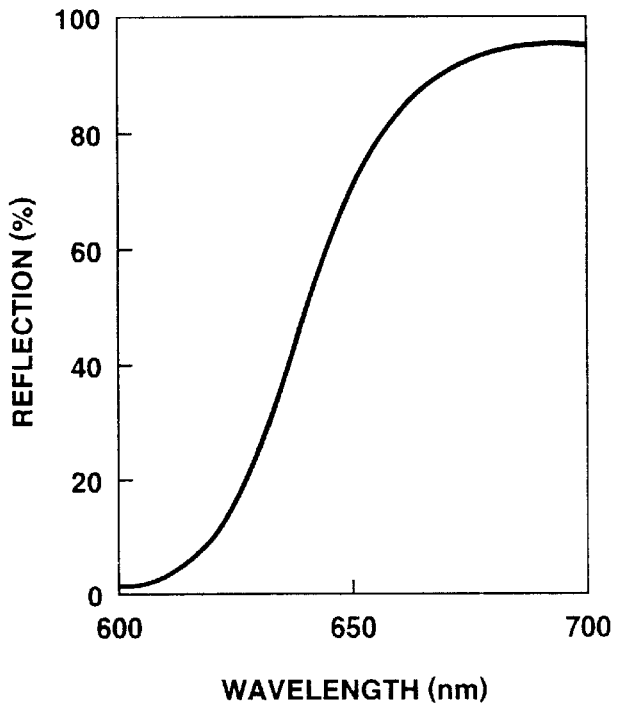
FIG. 10 shows a characteristic of an optical reflection spectrum of an optical recording medium using a pigment b1.
Figure 11:
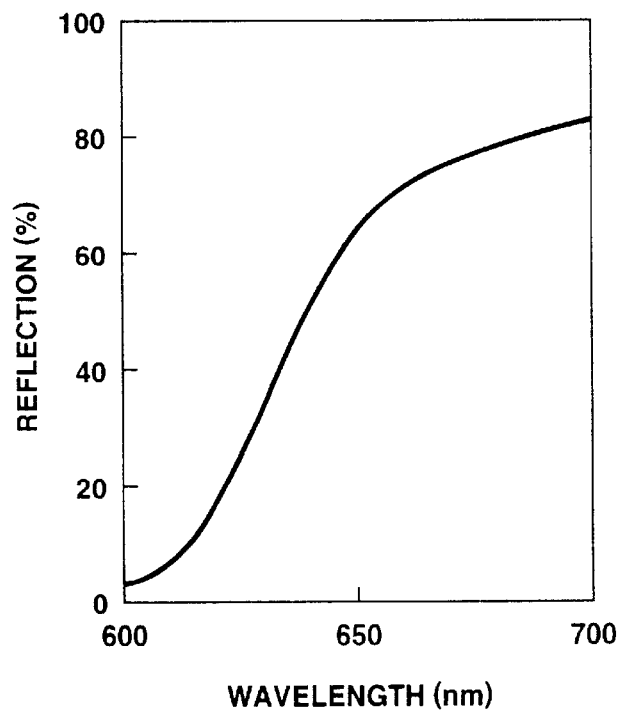
FIG. 11 shows a characteristic of an optical reflection spectrum of an optical recording medium using a pigment b2.

The optical discs prepared had the optical reflection spectra shown in FIG. 10 and FIG. 11. It should be noted that FIG. 10 shows the optical reflection spectrum of the optical disc prepared by using the pigment b1; and FIG. 11 shows the optical reflection spectrum of the optical disc prepared by using the pigment b2. Thus, for each of these optical discs, it was possible to obtain a reflection ratio of about 50% in the wavelength of 640 nm.

Next, for these optical discs, a recording test was carried out by using a red semiconductor laser of 640 nm as a light source under the same conditions as in Example 1.

As a result, in the optical disc using the pigment b1, recording was actually started with the laser power of about 7 mW. The signal modulation was increased as the laser power increased, and with the laser power of 12 mW, it was possible to obtain signal modulation of 60% or above.

Similarly, in the case of the optical disc using the pigment b2, recording was actually started with the laser power of about 7 mW. The signal modulation increased as the laser power increased and with the laser power of 12 mW, it was possible to obtain signal modulation of 60% or above.

Furthermore, for each of the optical discs, reproduction was carried out with the wavelength of 650 nm. Like in the case of recording with 640 nm, it was possible to obtain a preferable reproduction signal.

From the aforementioned, it can be understood that in the optical discs using the pigment b as the recording material, it is possible to carry out recording and reproduction with 640 nm and that the wavelength dependency is small in the vicinity of 640 nm, enabling to obtain a stable reproduction.

PREPARATORY EXPERIMENT 3-1

Examination of Pigment Compound c

As the pigment compound c, we have prepared pigment c2. In order to check the absorption spectrum of this pigment, the pigment was solved in tetrafluoropropanol to obtain a pigment solution of 3.0 weight/volume %. It should be noted that when the dissolution speed of a pigment was too slow, an ultrasonic washer and a slow mill were used to dissolve the pigment completely.

Figure 12:
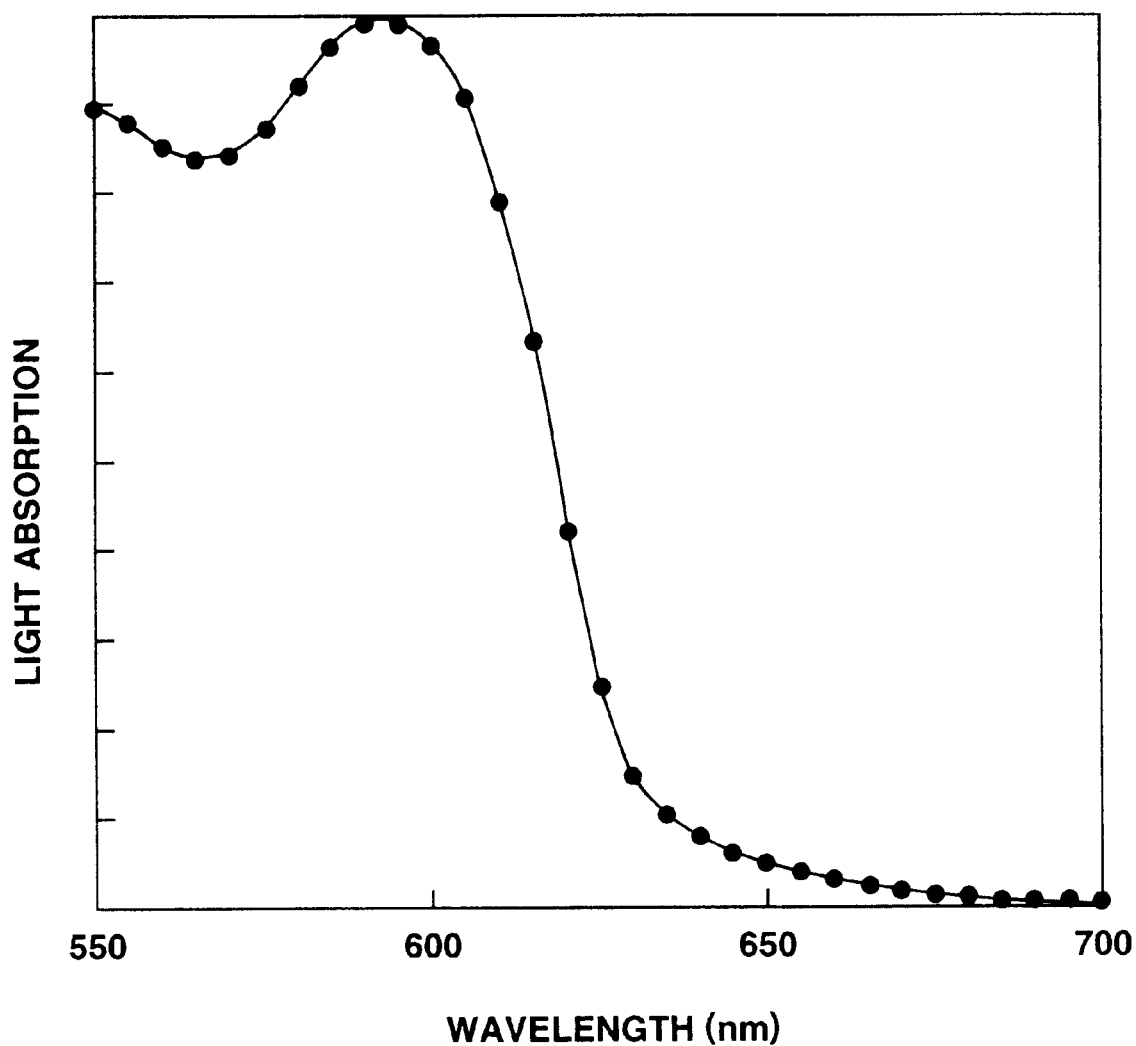
FIG. 12 is a plot showing an absorption spectrum of a pigment c2.

The pigment solution obtained was applied onto a glass plate of 3 cm×3 cm by way of spin coat method and dried to form a pigment layer and its absorption spectrum was observed. The pigments c2 had the absorption spectrum shown in FIG. 12. It should be noted that these absorption spectra are normalized at the maximum absorption of the spectra observed.

EXAMPLE 3-1

The pigment c2 was used solely as a recording material to prepare an optical disc as follows.

The pigments c2 was dissolved in tetrafluoropropanol to obtain a pigment solution. Note that the concentration of the pigment solution was adjusted so a reflection layer formed layer has a reflection ratio of 50% at the wavelength of 640 nm.

This pigment solution was used to prepare an optical disc in the same way as in Example 1.

Figure 13:
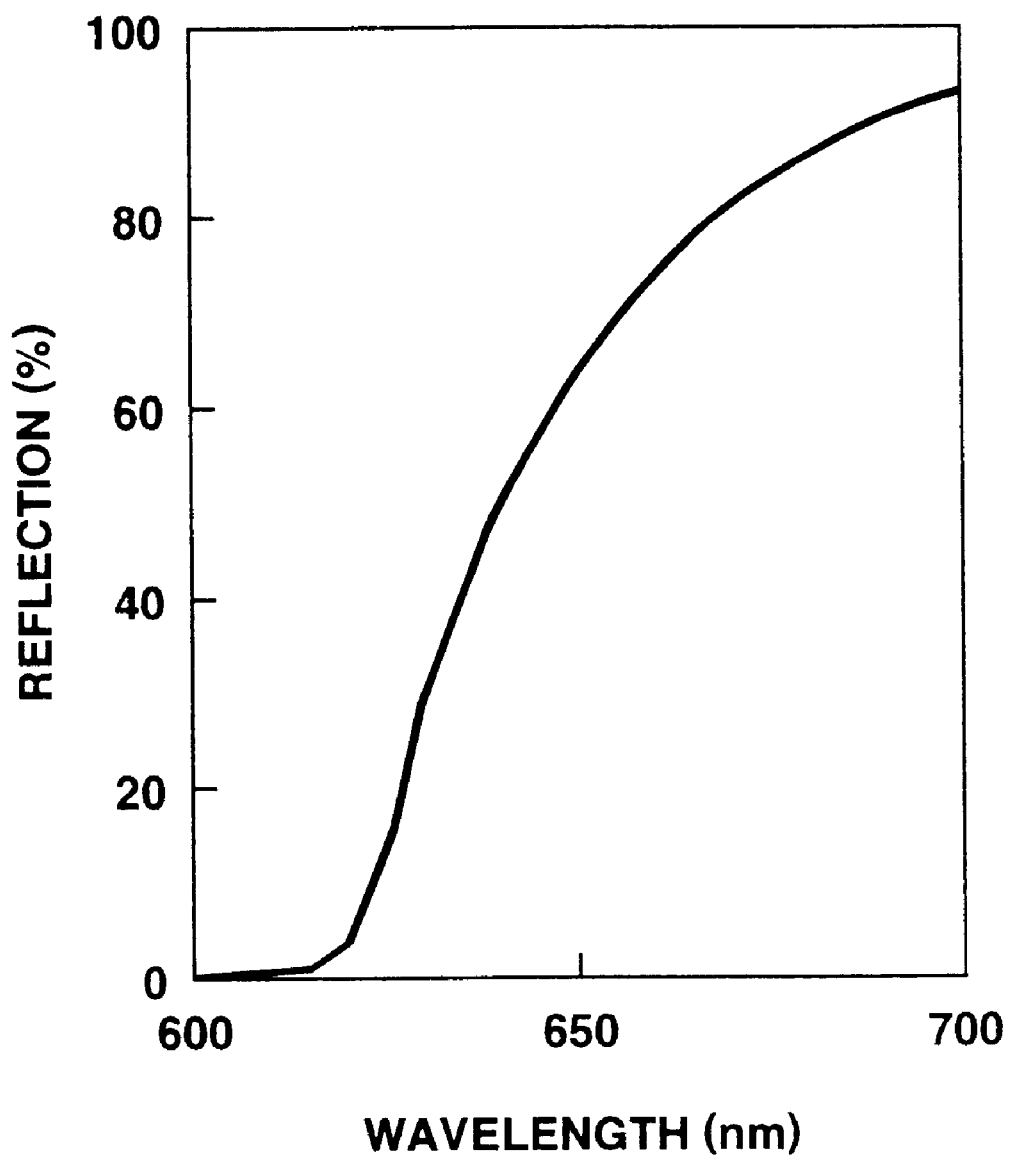
FIG. 13 shows a characteristic of an optical reflection spectrum of an optical recording medium using the pigment c2.

The optical discs prepared had the optical reflection spectra shown in FIG. 13. Thus, this optical disc enabled to obtain a reflection ratio of about 50% in the wavelength of 640 nm.

Next, for this optical disc, a recording test was carried out by using a red semiconductor laser of 640 nm as a light source under the same conditions as in Example 1.

As a result, in the optical disc using the pigment c2, recording was actually started with the laser power of about 6.5 mW. The signal modulation was increased as the laser power increased, and with the laser power of 10 mW, it was possible to obtain signal modulation of 60% or above.

Moreover, for this optical disc, reproduction was carried out with the wavelength of 650 nm. Like in the case of recording with 640 nm, it was possible to obtain a preferable reproduction signal.

From the aforementioned, it can be understood that in the optical discs using the pigment c as the recording material, it is possible to carry out recording and reproduction with 640 nm and that the wavelength dependency is small in the vicinity of 640 nm, enabling to obtain a stable reproduction.

PREPARATORY EXPERIMENT 4-1

Examination of Pigment Compound Mixtures 1

The pigment compound f shows almost no absorption at 640 nm.

Firstly, as the pigment compound f, we prepared pigments f7 to f9. In order to check the absorption spectra of these pigments, each of the pigments was dissolved in tetrafluoropropanol to obtain a pigment solution of 3.0 weight/volume %. It should be noted that when the dissolution speed of a pigment was too slow, an ultrasonic washer and a slow mill were used to dissolve the pigment completely.

Each of the pigment solutions obtained was applied onto a glass plate of 3 cm×3 cm by way of spin coat method and dried to form a pigment layer and its absorption spectrum was observed. The pigments f7 to f9 respectively had the absorption spectra shown in FIG. 14. It should be noted that these absorption spectra are normalized at the maximum absorption of the spectra observed.

Figure 14:
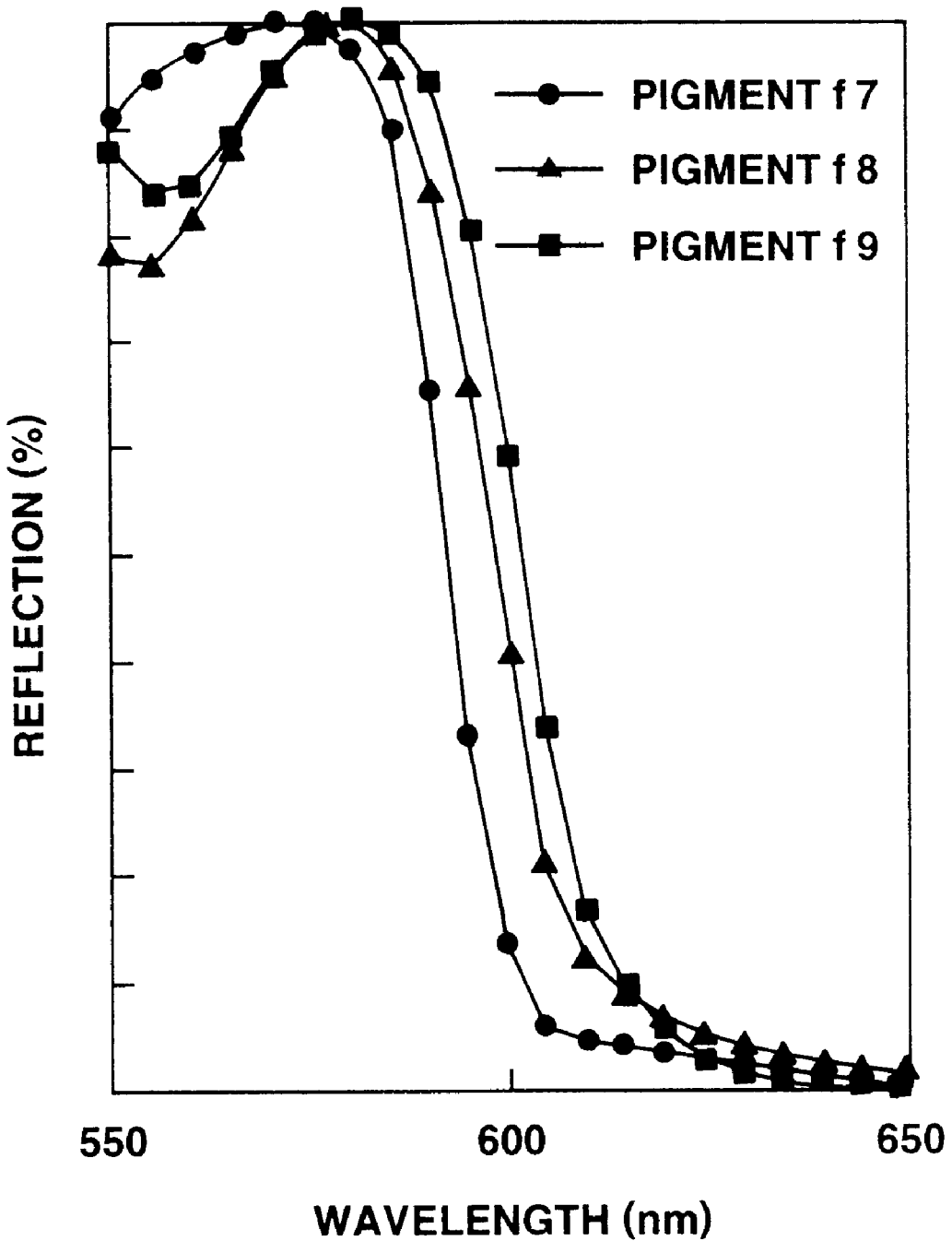
FIG. 14 is a plot showing a characteristic of an optical absorption spectrum of a pigment compound f.

FIG. 14 shows that the absorption end is shifted toward the longer wavelength side in the order of the pigment f7, pigment f8, and pigment f9, but there can be seen almost no absorption at 640 nm. Note that this shift of the absorption end toward the longer wavelength side reflects the spread of $\pi$ electron in a molecule.

EXAMPLE 4-1

A mixture of pigment a5 and pigment f7 and a mixture of pigment compound b2 and pigment compound f7 were respectively used as the recording material to prepare optical discs as follows.

The pigment a5 and the pigment f7 were mixed with a weight ratio of 10:4.5 and dissolved in tetrafluoropropanol to obtain a pigment solution; and the pigment b2 was mixed with pigment f9 with weight ratio of 10:2.5 and was dissolved in tetrafluoropropanol to obtain a pigment solution.

These pigment solutions were used to prepare optical discs in the same way as in Example 1-1.

Figure 15:
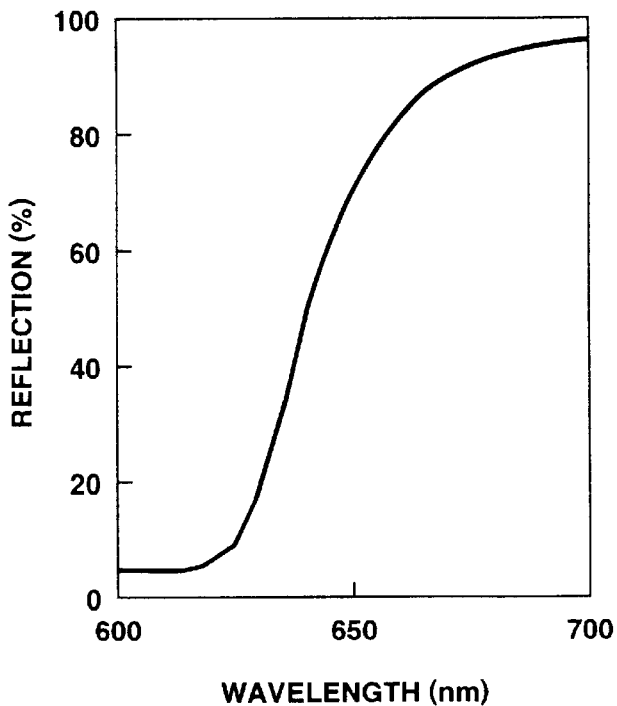
FIG. 15 shows a characteristic of an optical reflection spectrum of an optical recording medium using a mixture of pigments a5 and f7.
Figure 16:
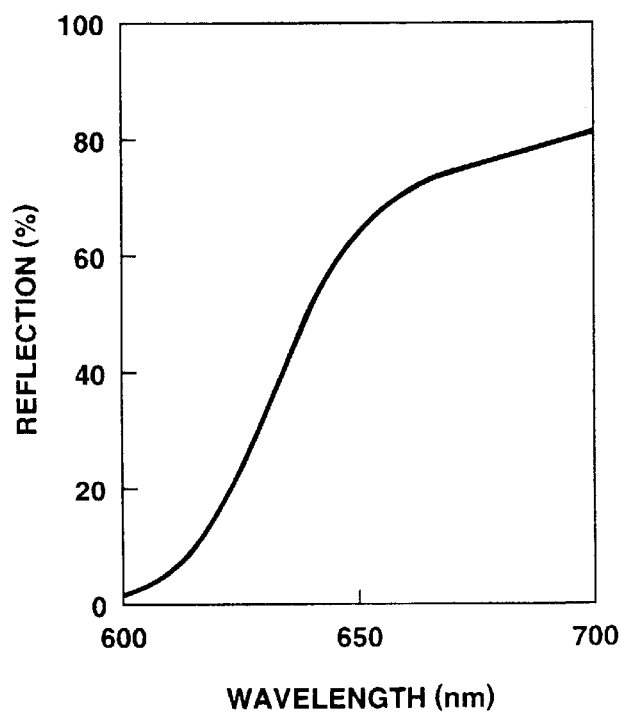
FIG. 16 shows a characteristic of an optical reflection spectrum of an optical recording medium using a mixture of pigments b2 and f9.

The optical discs thus prepared had optical reflection spectra shown in FIG. 15 and FIG. 6, respectively. Note that FIG. 15 shows the optical reflection spectrum of the optical disc using the mixture of pigment a5 and pigment f7; and FIG. 16 shows the optical reflection spectrum of the optical disc using the mixture of pigment b2 and pigment f9. Each of these pigment mixtures enabled to obtain a reflection ratio of about 50% at the wavelength of 640 nm.

Next, for these optical discs, a recording test was carried out by using a red semiconductor laser of 640 nm as a light source under the same conditions as in Example 1-1.

As a result, in the optical disc using the mixture of pigments a5 and f7, recording was actually started with the laser power of about 7 mW. The signal modulation was increased as the laser power increased, and with the laser power of 12 mW, it was possible to obtain signal modulation of 60% or above.

Almost similarly, in the optical disc using the mixture of the pigments b2 and f9, recording actually started with the laser power of about 6 mW. The signal modulation increased as the laser power increased. With the laser power of 12 mW, it was possible to obtain signal modulation of 60% or above.

Moreover, reproduction was carried out with the wavelength changed to 650 nm. Like in the case of recording with 640 nm, it was possible to obtain a preferable reproduction signal.

From the aforementioned, it can be understood that although the pigment compound f shows no absorption at 640 nm, if mixed with the pigment compound a or pigment compound b, it can be used to carry out recording/reproduction at 640 nm. Moreover, in the optical discs using these mixtures as the recording material, the wavelength dependency is small in the vicinity of 640 nm, enabling to obtain a stable reproduction.

It should be noted that as polymethine pigment compound not having absorption at 640 nm, there can be exemplified a pigment d1 (absorption maximum wavelength 525 nm), pigment d2 (absorption maximum wavelength 559 nm), pigment e3 (absorption maximum wavelength 550 nm), and pigment f3 (absorption maximum wavelength 527 nm). Each of these pigments was mixed with the pigment a5 to obtain mixtures as the recording material of optical discs for carrying out a recording test. Each of the optical discs resulted in that the laser power required for recording was in the range of 10 to 12 mW, causing no practical problem for recording. However, it was observed that as the absorption maximum wavelength is shifted to the longer wavelength side, the laser power required for recording is reduced.

PREPARATORY EXPERIMENT 5-1

Examination of Pigment Compound Mixtures

The pigment compound i is an organic pigment showing absorption at 640 nm, and when mixed with other pigment compound, exhibits an effect to reduce the wavelength dependency in the vicinity of 640 nm.

Firstly, as the pigment compound i, we prepared pigments i4 to i7. In order to check the absorption spectra of these pigments, each of the pigments was dissolved in tetrafluoropropanol to obtain a pigment solution of 3.0 weight/volume %. It should be noted that when the dissolution speed of a pigment was too slow, an ultrasonic washer and a slow mill were used to dissolve the pigment completely.

Each of the pigment solutions obtained was applied onto a glass plate of 3 cm×3 cm by way of spin coat method and dried to form a pigment layer and its absorption spectrum was observed. The pigments i4 and i7 respectively had the absorption spectra shown in FIG. 17. It should be noted that these absorption spectra are normalized at the maximum absorption of the spectra observed.

Figure 17:
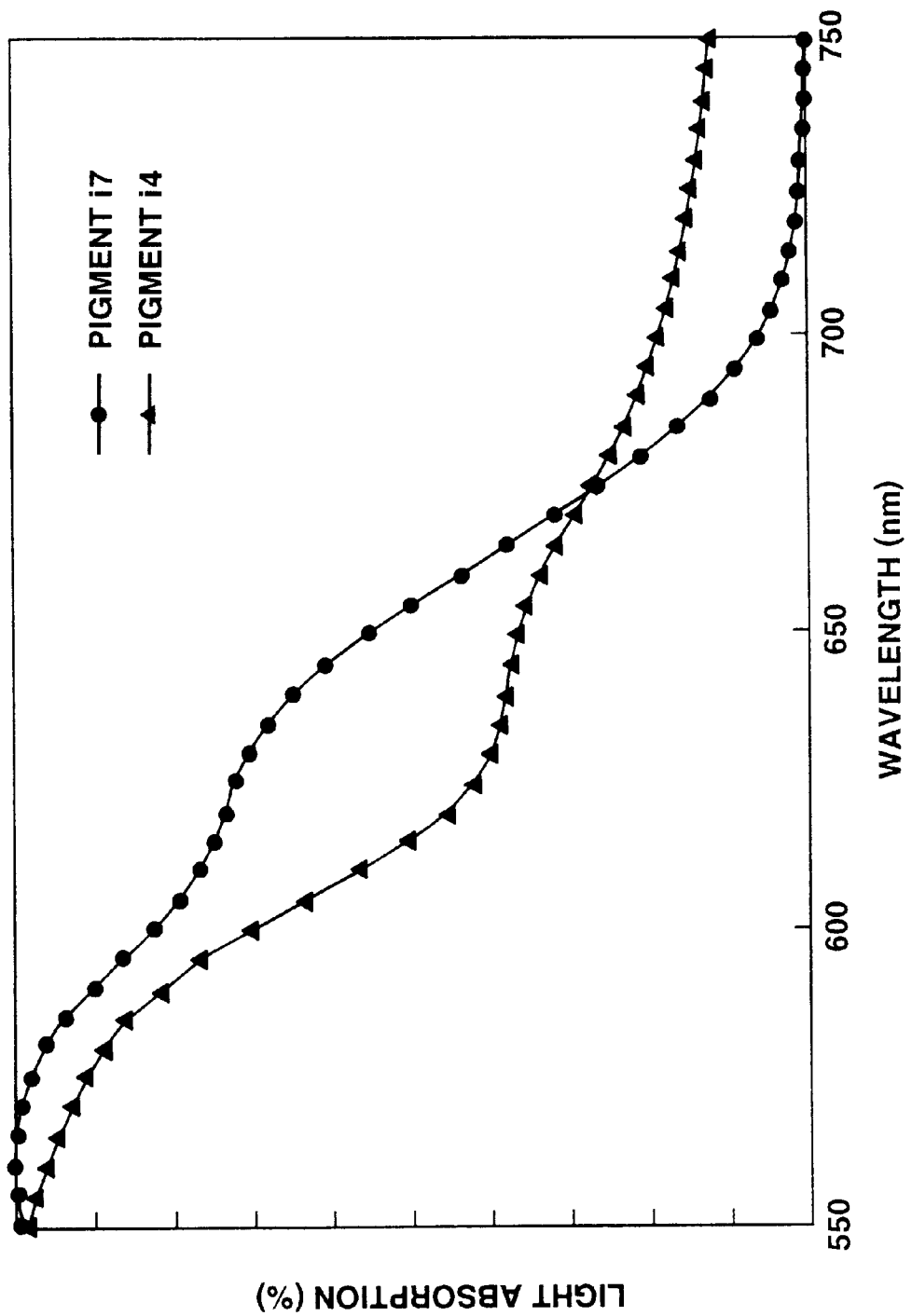
FIG. 17 is a plot showing a characteristic of an optical absorption spectrum of a pigment compound i.

FIG. 17 shows that the absorption spectra of these pigments i4 and i7 are characterized in that the absorption end of the loner wavelength side extends over 700 nm toward the longer wavelength side.

EXAMPLE 5-1

A mixture of pigment a3 and pigment i4 and a mixture of pigment compound f9 and pigment compound i7 were respectively used as the recording material to prepare optical discs as follows.

The pigment a3 and the pigment i4 were mixed with a weight ratio of 10:9.5 and dissolved in tetrafluoropropanol to obtain a pigment solution; and the pigment f9 was mixed with pigment i7 with weight ratio of 10:8 and dissolved in tetrafluoropropanol to obtain a pigment solution.

These pigment solutions were used to prepare optical discs in the same way as in Example 1-1.

Figure 18:
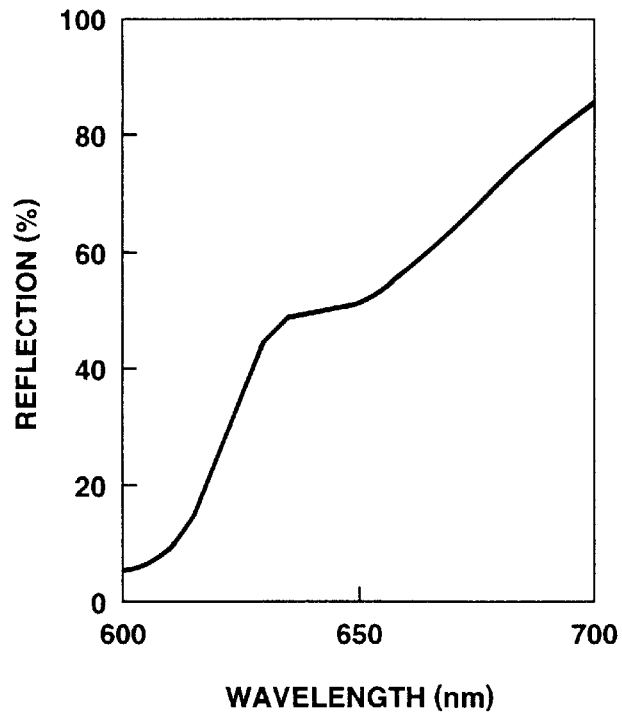
FIG. 18 shows a characteristic of an optical reflection spectrum of an optical recording medium using a mixture of pigments a3 and i4.

The optical discs thus prepared had optical reflection spectra shown in FIG. 18. Note that FIG. 18 shows the optical reflection spectrum of the optical disc using the mixture of pigment a3 and pigment i4; and FIG. 19 shows the optical reflection spectrum of the optical disc using the mixture of pigment f9 and pigment i7.

Firstly, in the case of the optical reflection spectrum obtained from the use of the mixture of pigments a3 and i4 shown in FIG. 18, it can be understood that the reflection ratio increases toward the longer wavelength side but this increase is slowed in the vicinity of 640 nm.

Figure 19:
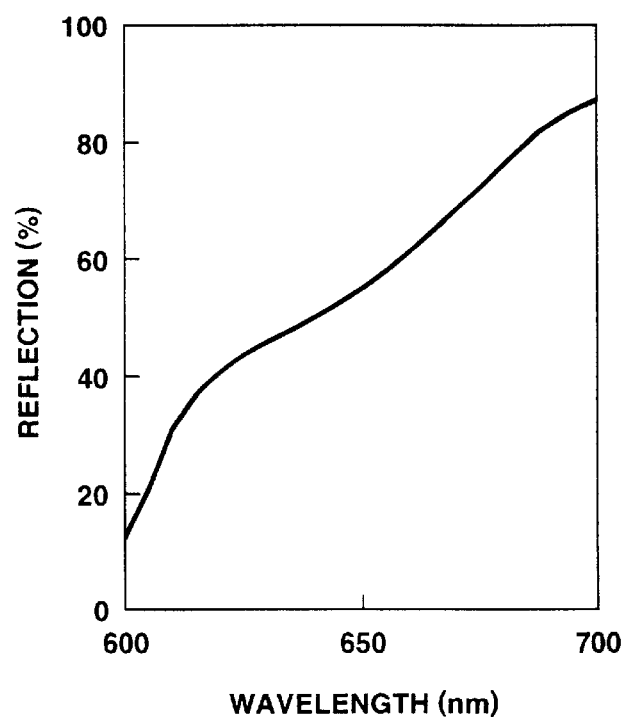
FIG. 19 shows a characteristic of an optical reflection spectrum of an optical recording medium using a mixture of pigments f9 and i7.

Moreover, in the optical reflection spectrum obtained from the use of the mixture of pigments f9 and i7 shown in FIG. 19, the reflection ratio increases toward the longer wavelength side but the increase is suppressed in the vicinity of 640 nm.

Thus, it can be understood that when a pigment compound is mixed with pigment i4 or pigment i7, the wavelength dependency of the reflection ratio is reduced in the vicinity of 640 nm. In particular, the combination of pigments a3 and i4 remarkably reduces the wavelength dependency of the reflection ratio.

Next, for these optical discs, a recording test was carried out by using a red semiconductor laser of 640 nm as a light source under the same conditions as in Example 1-1.

As a result, in the optical disc using the mixture of pigments a3 and i4, recording was actually started with the laser power of about 6 mW. The signal modulation was increased as the laser power increased, and with the laser power of 10 mW, it was possible to obtain signal modulation of 60% or above.

Almost similarly, in the optical disc using the mixture of the pigments f8 and i7, recording actually started with the laser power of about 7 mW. The signal modulation increased as the laser power increased. With the laser power of 11 mW, it was possible to obtain signal modulation of 60% or above.

Moreover, reproduction was carried out with the wavelength changed to 650 nm. Like in the case of recording with 640 nm, it was possible to obtain a preferable reproduction signal.

From the aforementioned, it can be understood that in an optical disc using a mixture of pigments i4 and i7 with other pigment compound, the wavelength dependency is small in the vicinity of 640 nm, enabling to obtain a stable reproduction.

It should be noted that a mixture containing the pigment compound g, pigment compound h, or pigment compound i other than those used here also has the effect to reduce the wavelength dependency in the vicinity of 640 nm.

PREPARATORY EXPERIMENT 6-1

Examination of Pigment Compound Mixtures 3

The pigment compound j is an organic pigment showing absorption at 640 nm, and when mixed with other pigment compound, exhibits an effect to reduce the wavelength dependency in the vicinity of 640 nm.

Firstly, as the pigment compound i, we prepared pigments ji to j6. In order to check the absorption spectra of these pigments, each of the pigments was dissolved in tetrafluoropropanol to obtain a pigment solution of 3.0 weight/volume %. It should be noted that when the dissolution speed of a pigment was too slow, an ultrasonic washer and a slow mill were used to dissolve the pigment completely.

Each of the pigment solutions obtained was applied onto a glass plate of 3 cm×3 cm by way of spin coat method and dried to form a pigment layer and its absorption spectrum was observed. The pigments j1 and j6 respectively had the absorption spectra shown in FIG. 20. It should be noted that these absorption spectra are normalized at the maximum absorption of the spectra observed.

Figure 20:
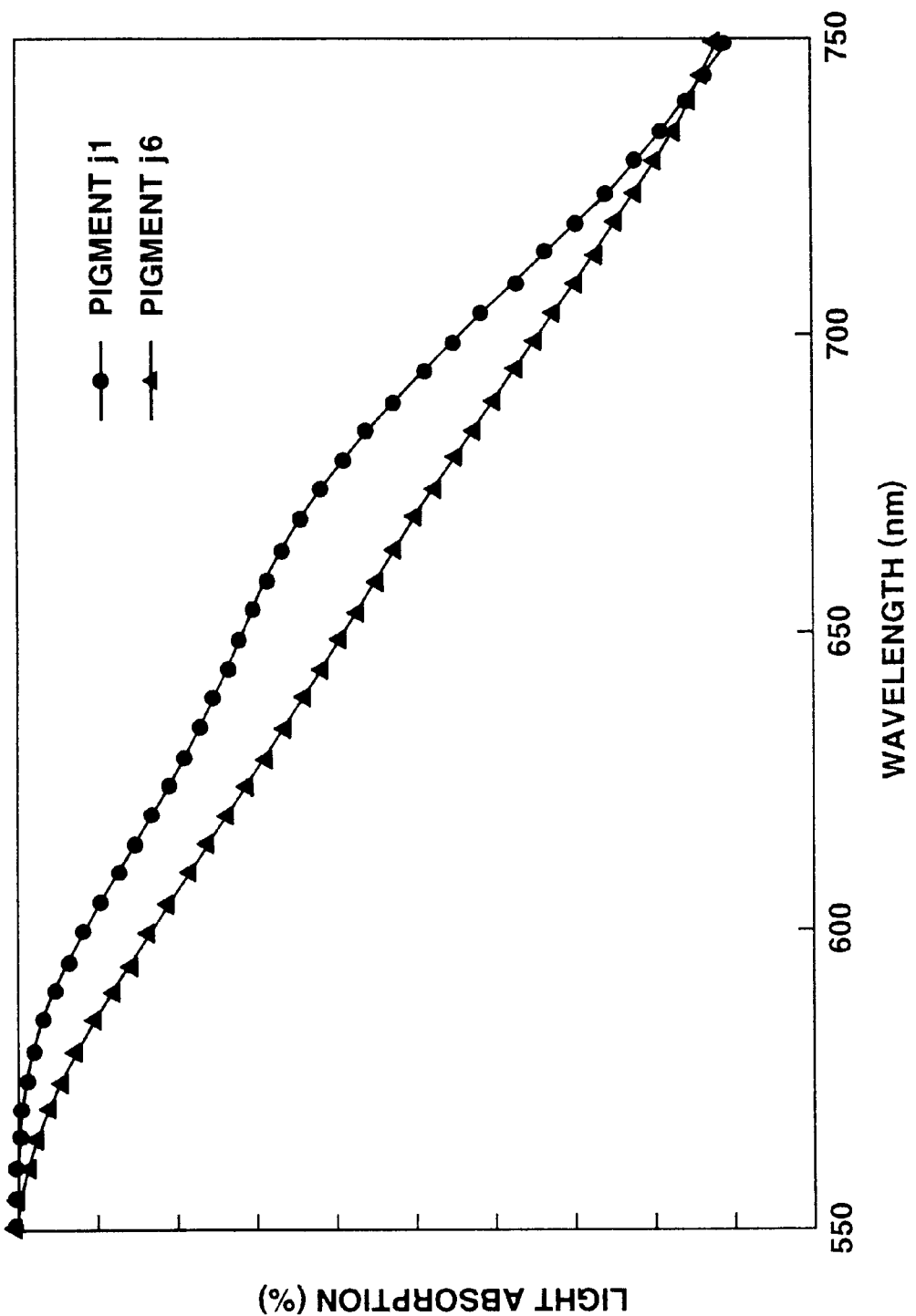
FIG. 20 is a plot showing a characteristic of an optical absorption spectrum of a pigment compound j.

FIG. 20 shows that the absorption spectra of these pigments ji and j6 are characterized in that the absorption end of the loner wavelength side extends over 700 nm toward the longer wavelength side.

EXAMPLE 6-1

A mixture of pigment compounds a1 and j6, and a mixture of pigment compounds a3 and j1 were respectively used as the recording material to prepare optical discs as follows.

The pigment a1 and the pigment j6 were mixed with a weight ratio of 15:14 and dissolved in tetrafluoropropanol to obtain a pigment solution; and the pigment a3 was mixed with pigment j1 with weight ratio of 10:5 and dissolved in tetrafluoropropanol to obtain a pigment solution.

These pigment solutions were used to prepare optical discs in the same way as in Example 1-1.

Figure 21:
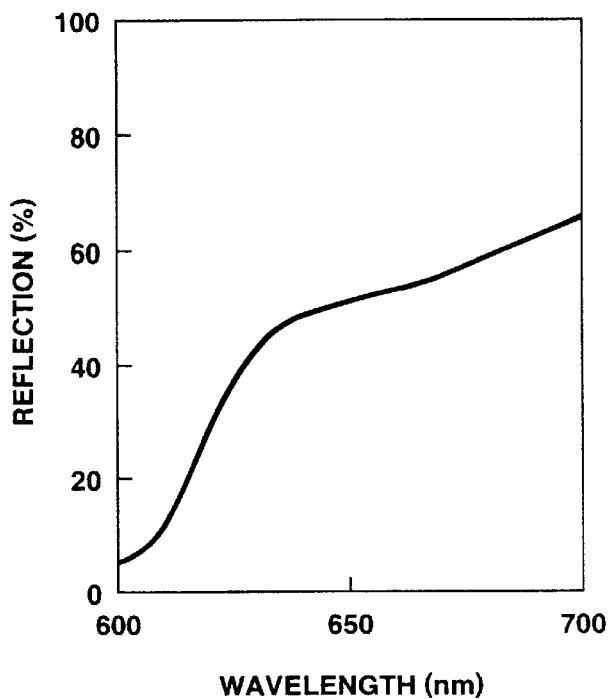
FIG. 21 shows a characteristic of an optical reflection spectrum of an optical recording medium using a mixture of pigments a1 and j6.
Figure 22:
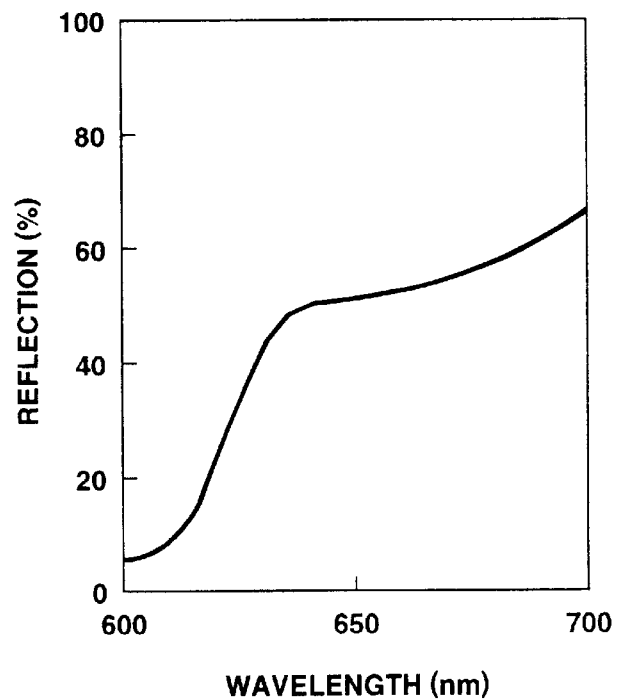
FIG. 22 shows a characteristic of an optical reflection spectrum of an optical recording medium using a mixture of pigments a3 and j1.

The optical discs thus prepared had optical reflection spectra shown in FIG. 21 and FIG. 22. Note that FIG. 21 shows the optical reflection spectrum of the optical disc using the mixture of pigment a1 and pigment j6; and FIG. 22 shows the optical reflection spectrum of the optical disc using the mixture of pigment a3 and pigment j1.

Firstly, in the case of the optical reflection spectrum obtained from the use of the mixture of pigments a1 and j6 shown in FIG. 21, it can be understood that the reflection ratio increases toward the longer wavelength side but this increase is slowed down in the vicinity of 640 nm.

Moreover, in the optical reflection spectrum obtained from the use of the mixture of pigments a3 and j1 shown in FIG. 22, the reflection ratio increases toward the longer wavelength side but the increase is suppressed in the vicinity of 640 nm.

Thus, it can be understood that when a pigment compound is mixed with pigment ji or pigment j6, the wavelength dependency of the reflection ratio is reduced in the vicinity of 640 nm.

Next, for these optical discs, a recording test was carried out by using a red semiconductor laser of 640 nm as a light source under the same conditions as in Example 1-1.

As a result, in the optical disc using the mixture of pigments a1 and j6, recording was actually started with the laser power of about 6.5 mW. The signal modulation was increased as the laser power increased, and with the laser power of 10 mW, it was possible to obtain signal modulation of 60% or above.

Almost similarly, in the optical disc using the mixture of the pigments f8 and i7, recording actually started with the laser power of about 7 mW. The signal modulation increased as the laser power increased. With the laser power of 10.5 mW, it was possible to obtain signal modulation of 60% or above.

Moreover, reproduction was carried out with the wavelength changed to 650 nm. Like in the case of recording with 640 nm, it was possible to obtain a preferable reproduction signal.

In an optical disc using a mixture of pigment j with other pigment compound, the wavelength dependency is small in the vicinity of 640 nm, enabling to obtain a stable reproduction.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. An optical recording medium comprising:

a recording layer and an optical reflection layer formed on a light transmitting substrate, wherein the recording layer consists of a trimethine pigment expressed by Structural Formula I, a trimethine pigment expressed by Structural Formula II, and a trimethine pigment expressed by Structural Formula III as follows:

Structural Formula I:

X- wherein X— is selected from the group consisting of Br⁻, I⁻, ClO$_4^-$, BF$_4^-$, PF$_6^-$, and SbF$_6^-$; wherein, A$^1$ is an atomic group selected from the group consisting of Chemical Formulae 1 through 3, and B$^1$ is an atomic group selected from the group consisting of Chemical Formula 4;

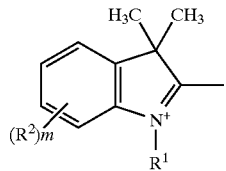

Chemical Formula 1

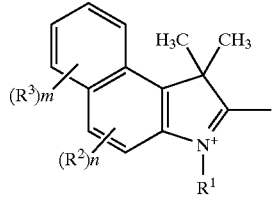

Chemical Formula 2

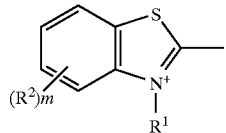

Chemical Formula 3

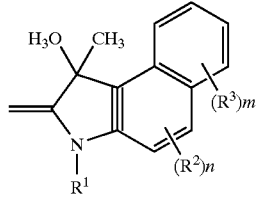

Chemical Formula 4 wherein, R$^1$ is selected from the group consisting of alkyl group, alkoxy group, and aryl group; R$^2$ and R$^3$ are selected from the group consisting of hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

Structural Formula II:

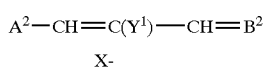

X- wherein X— is selected from the group consisting of Br—, I—, ClO$_4^-$, BF$_4^-$, PF$_6^-$, and SbF$_6^-$; A$^2$ is an atomic group selected from the group consisting of Chemical Formulae 5 through 8; and B$^2$ is an atomic group selected from the group consisting of Chemical Formula 9; wherein Y$^1$ is selected from the group consisting of hydrogen atom, alkyl group, or halogen atom,

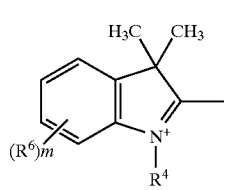

Chemical Formula 5

Chemical Formula 6

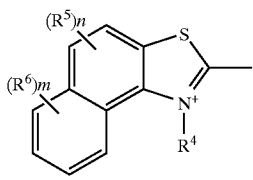

Chemical Formula 7

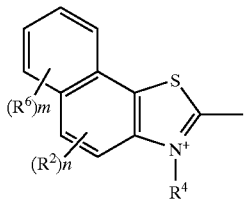

Chemical Formula 8

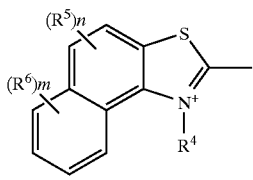

Chemical Formula 9

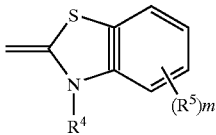

wherein, $R^4$ is selected from the group consisting of alkyl group, alkoxy group, and aryl group; wherein, $R^5$ and $R^6$ are selected from the group consisting of hydrogen atom, alkyl group, alkoxy group, amino group, vitro group, cyano group, aryl group, alkoxycarbonyl group, sulfonylalkyl group, and halogen atom; when a molecule contains a plurality of $R^5$ or $R^6$, the $R^5$ or $R^6$ may be either identical substituents or different substituents; n is 1 or 2; m is 1, 2, 3, or 4;

Structural Formula III:

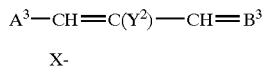

wherein X— is selected from the group consisting of Br—, I—, $ClO_4^-$, $BF_4^-$, $PF_6^-$, and $SbF_6^-$; $A^3$ is an atomic group selected from the group consisting of Chemical Formulae 10 to 13; $B^3$ is an atomic group selected from the group consisting of Chemical Formulae 14 and 15; $Y^2$ is selected from the group consisting of hydrogen atom, alkyl group, or halogen atom;

Chemical Formula 10

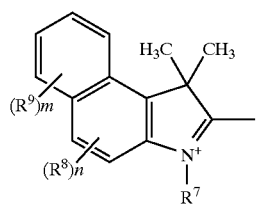

Chemical Formula 11

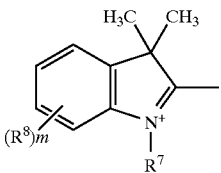

Chemical Formula 12

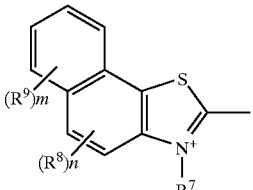

Chemical Formula 13

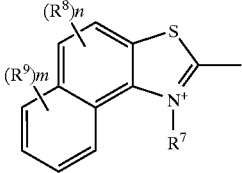

Chemical Formula 14

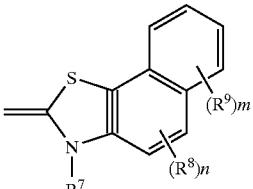

Chemical Formula 15

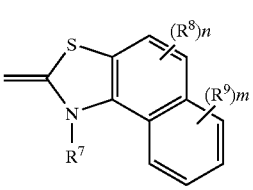

wherein, $R^1$ is selected from the group consisting of alkyl group, alkoxy group, and aryl group; $R^8$ and $R^9$ are selected from the group consisting of hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

a singlet oxygen quencher added to the pigments to deactivate singlet oxygen, the singlet oxygen quencher is selected from the group consisting of a nickel metal complex compound, a copper complex compound, a hindered amine compound, an aromatic amine compound, and an aromatic immonium chloride compound;

the recording layer having a thickness of 50 to 1000 nm;

wherein the recording layer is capable of recording and reproduction with a laser beam having a wavelength from 630 nm to 650 nm; and wherein the optical recording medium has a signal modulation degree of 60% or higher and an unrecorded area has a reflection ratio of approximately 50% when measured with a laser beam having a wavelength of 640 nm.

2. An optical recording medium comprising a recording layer and an optical reflection layer formed on a light transmitting substrate, wherein the recording layer consists of first dye expressed by Structural Formula VII, second dye expressed by Structural Formula VIII, a third dye expressed by Structural Formula IX, and a fourth dye expressed by Structural Formula X as follows:

Structural Formula VII:

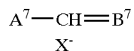
    X$^-$ wherein X— is selected from the group consisting of Br—, I—, $ClO_4^-$, $BF_4^-$, $PF_6^-$, and $SbF_6^-$; A7 is an atomic group expressed by Chemical Formula 31; $B^7$ is an atomic group expressed by Chemical Formula 32

Chemical Formula 31

Chemical Formula 32

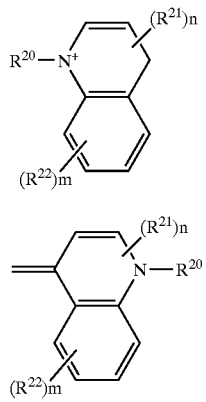

wherein, $R^{20}$ is selected from the group consisting of alkyl group, alkoxy group, and aryl group; $R^{21}$ and $R^{22}$ are selected from the group consisting of hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

Structural Formula VIII:

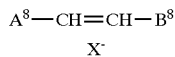
    X$^-$ wherein X— is selected from the group consisting of Br—, I—, $ClO_4^-$, $BF_4^-$, $PF_6^-$, and $SbF_6^-$; $A^8$ is an atomic group selected from the group consisting of Chemical Formulae 33 to 36; $B^8$ is an atomic group expressed by Chemical Formula 37;

Chemical Formula 33

Chemical Formula 34

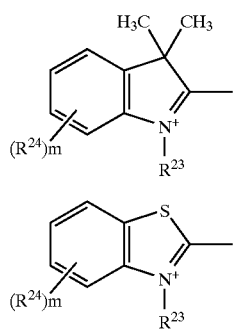

Chemical Formula 35

Chemical Formula 36

Chemical Formula 37

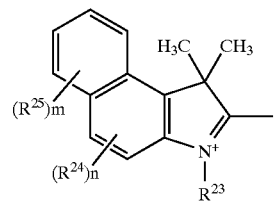

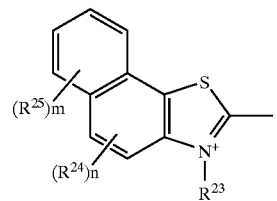

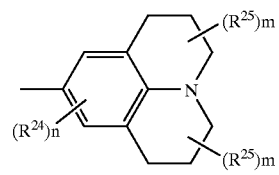

wherein, $R^{23}$ is selected from the group consisting of alkyl group, alkoxy group, and aryl group; $R^{24}$ and $R^{25}$ are selected from the group consisting-of hydrogen atom, alkyl group, alkoxy group, amino group, vitro group, cyano group, aryl group, alkoxycarbonyl group, sulfonylalkyl group, and halogen atom; n is 1 or 2; m is 1, 2, 3, or 4;

Structural Formula IX:

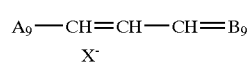
    X$^-$ wherein X— is selected from the group consisting of Br—, I—, $ClO_4^-$, $BF_4^-$, $PF_6^-$, and $SbF_6^-$ $A^9$ is an atomic group selected from the group consisting of Chemical Formulae 38 to 44; $B^9$ is an atomic group selected from the group consisting of Chemical Formulae 45 and 46;

Chemical Formula 38

Chemical Formula 39

Chemical Formula 40

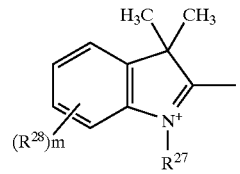

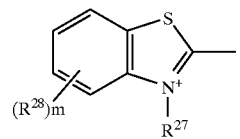

Chemical Formula 41

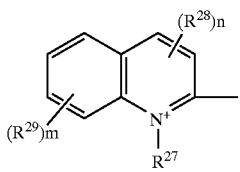

Chemical Formula 42

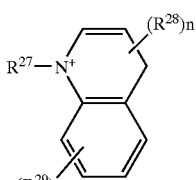

Chemical Formula 43

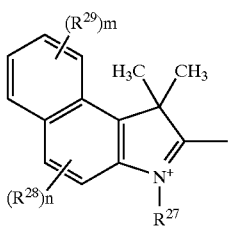

Chemical Formula 44

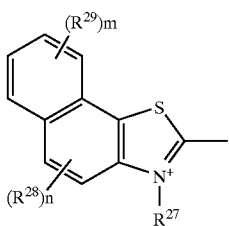

Chemical Formula 45

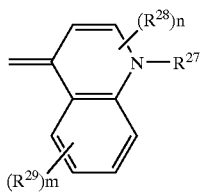

Chemical Formula 46

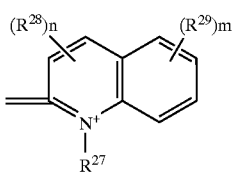

wherein, $R^{27}$ is selected from the group consisting of alkyl group, alkoxy group, and aryl group; $R^{28}$ and $R^{29}$ are selected from the group consisting of hydrogen atom, alleyl group, alkoxy group, amino group, vitro group, cyano group, aryl group, alkoxycarbonyl group, sulfonylalkyl group, and halogen atom; n is 1 or 2; m is 1, 2, 3, or 4;

Structural Formula X:

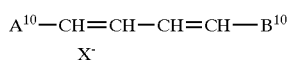

wherein X— is selected from the group consisting of Br—, I—, $ClO_4^-$, $BF_4^-$, $PF_6^-$, and $SbF_6^-$; $A^{10}$ is an atomic group selected from the group consisting of Chemical Formulae 47 to 53, and $B^{10}$ is an atomic group selected from the group consisting of Chemical Formulae 54 and 55;

Chemical Formula 47

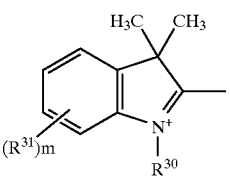

Chemical Formula 48

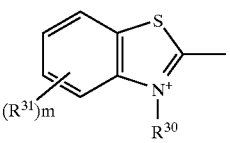

Chemical Formula 49

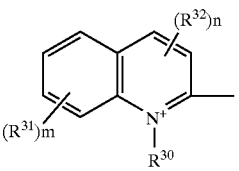

Chemical Formula 50

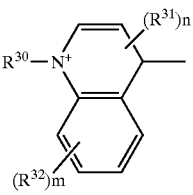

Chemical Formula 51

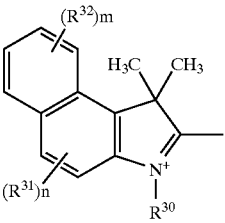

Chemical Formula 52

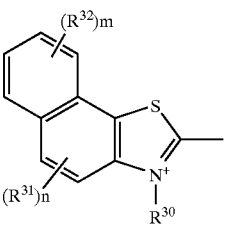

Chemical Formula 53

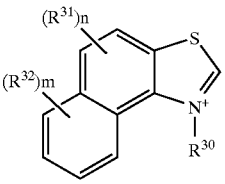

Chemical Formula 54

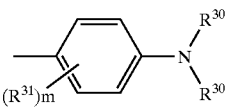

-continued

Chemical Formula 55

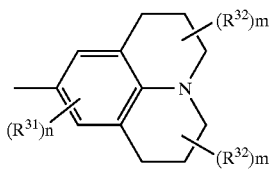

wherein, $R^3$ is selected from the group consisting of alkyl group, alkoxy group, and aryl group; $R^{31}$ and $R^{32}$ are selected from the group consisting of hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

wherein the dependence of the reflection ratio to the wavelength of the laser beam is 640 nm in comparison to the dependence of the reflection ratio to the wavelength of the laser beam outside the range.

3. An optical recording medium comprising a recording layer and an optical reflection layer formed on a light transmitting substrate selected from the group consisting of a polymetal resin, polycarbonate resin, and polyolefin resin, wherein the recording layer consists of a first dye expressed by Structural Formula XI, a second dye expressed by Structural Formula XII, and a third dye expressed by Structural Formula XIII as follows:

Structural Formula XI:

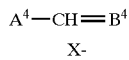

wherein X— is selected from the group consisting of $Br^-$, $I^-$, $ClO_4^-$, $BF_4^-$, $PF_6^-$, and $SbF_6^-$, $A^4$ is an atomic group selected from the group consisting of Chemical Formula 56, and $B^4$ is an atomic group selected from the group consisting of Chemical Formulae 57 and 58;

Chemical Formula 56

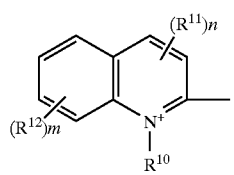

Chemical Formula 57

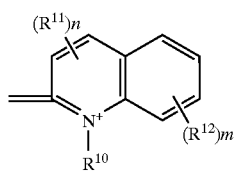

Chemical Formula 58

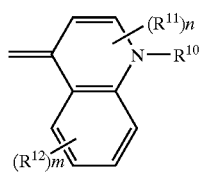

wherein, $R^{10}$ is selected from the group consisting of alkyl group, alkoxy group, and aryl group; $R^{11}$ and $R^{12}$ are selected from the group consisting of hydrogen atom, alkyl group, alkoxy group, amino group, vitro group, cyano group, aryl group, alkoxycarbonyl group, sulfonylalkyl group, and halogen atom; n is 1 or 2; m is 1, 2, 3, or 4;

Structural Formula XII:

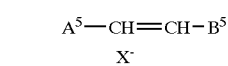

wherein X— is selected from the group consisting of Br—, I—, $ClO_4^-$, $BF_4^-$, $PF_6^-$, and $SbF_6^-$, $A^5$ is an atomic group selected from the group consisting of Chemical Formulae 59 to 64, and $B^5$ is an atomic group selected from the group consisting of Chemical Formula 65;

Chemical Formula 59

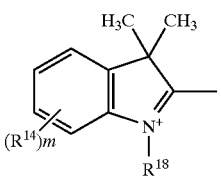

Chemical Formula 60

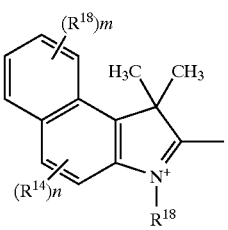

Chemical Formula 61

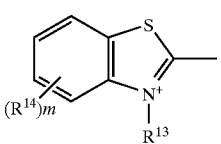

Chemical Formula 62

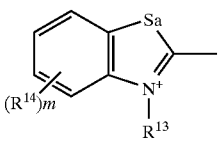

Chemical Formula 63

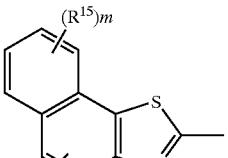

Chemical Formula 64

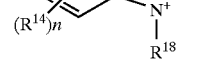

Chemical Formula 65

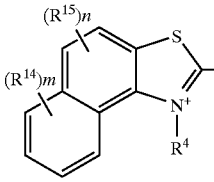

wherein, $R^{13}$ is selected from the group consisting of alkyl group, alkoxy group, and aryl group; $R^{14}$ and $R^{15}$ are selected from the group consisting of hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

Structural Formula XIII:

$$A^6-CH=C(Y^3)-CH=B^6$$
$$X-$$

wherein X— is selected from the group consisting of Br—, I—, $ClO_4^-$, $BF_4^-$, $PF_6^-$, and $SbF_6^-$, $A^6$ is an atomic group selected from the group consisting of Chemical Formulae 66 to 68, and $B^6$ is an atomic group selected from the group consisting of Chemical Formulae 69 and 70; $Y^3$ is selected from the group consisting of hydrogen atom, alkyl group, and halogen atom;

Chemical Formula 66

Chemical Formula 67

Chemical Formula 68

Chemical Formula 69

Chemical Formula 70 wherein, $R^{16}$ and $R^{18}$ are selected from the group consisting of alkyl group, alkoxy group, and aryl group; $R^{17}$ and $R^{19}$ are selected from the group consisting of hydrogen atom, alkyl group, alkoxy group, amino group, vitro group, cyano group, aryl group, alkoxycarbonyl group, sulfonylalkyl group, and halogen atom; m is 1, 2, 3, or 4;

a singlet oxygen quencher added to the pigments to deactivate singlet oxygen, the singlet oxygen quencher is selected from the group consisting of a nickel metal complex compound, a copper complex compound, a hindered amine compound, an aromatic amine compound, and an aromatic immonium chloride compound;

the recording layer having a thickness of 50 to 1000 nm; and wherein the recording layer is capable of recording and reproduction with a laser beam having a wavelength from 630 nm to 650 nm.

4. An optical recording medium comprising a recording layer and an optical reflection layer formed on a light transmitting substrate, wherein the recording layer consists of a first dye expressed by Structural Formula XIV, a second dye expressed by Structural Formula XV, a third dye expressed by Structural Formula XVI, and fourth dye expressed by Structural Formula XVII as follows:

Structural Formula XIV:

$$A^7-CH=B^7$$
$$X-$$

wherein X— is selected from the group consisting of Br—, I—, $ClO_4^-$, $BF_4^-$, $PF_6^-$, and $SbF_6^-$; $A^7$ is an atomic group expressed by Chemical Formula 71; $B^7$ is an atomic group expressed by Chemical Formula 72;

Chemical Formula 71

Chemical Formula 72 wherein, $R^{20}$ is selected from the group consisting of alkyl group, alkoxy group, and aryl group; $R^{21}$ and $R^{22}$ are selected from the group consisting of hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

Structural Formula XV:

$$A^8-CH=CH-B^8$$
$$X-$$

wherein X— is selected from the group consisting of Br—, I—, $ClO_4^-$, $BF_4^-$, $PF_6^-$, and $SbF_6^-$, $A_8$ is an atomic group selected from the group consisting of Chemical Formulae 73 to 76, and $B^8$ is an atomic group expressed by Chemical Formula 77;

Chemical Formula 73

-continued

Chemical Formula 74

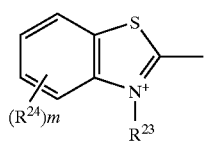

Chemical Formula 75

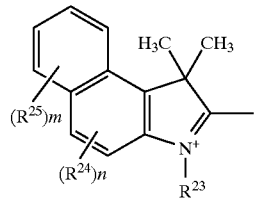

Chemical Formula 76

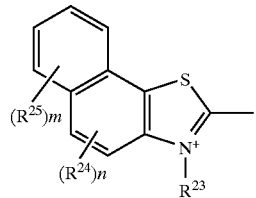

Chemical Formula 77

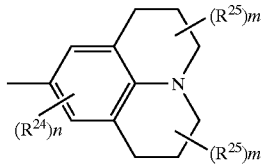

wherein, $R^{23}$ is selected from the group consisting of alkyl group, alkoxy group, and aryl group; $R^{24}$, $R^{25}$, and $R^{26}$ are selected from the group consisting of hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

Structural Formula XVI:

$$A^9-CH=CH-CH=B^9$$
$$X-$$

wherein X— is selected from the group consisting of Br—, I—, $ClO_4^-$, $BF_4^-$, $PF_6^-$, and $SbF_6^-$, $A^9$ is an atomic group selected from the group consisting of Chemical Formulae 78 to 84; $B^9$ is an atomic group selected from the group consisting of Chemical Formulae 85 and 86;

Chemical Formula 78

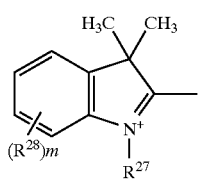

Chemical Formula 79

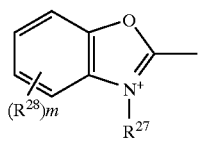

Chemical Formula 80

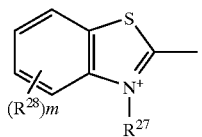

Chemical Formula 81

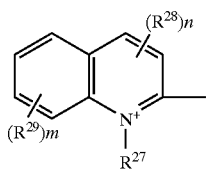

Chemical Formula 82

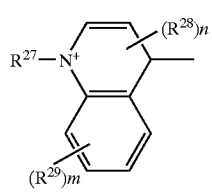

Chemical Formula 83

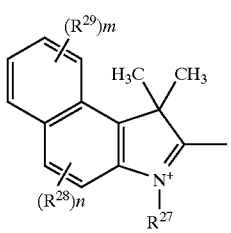

Chemical Formula 84

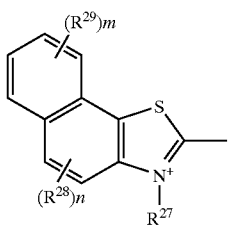

Chemical Formula 85

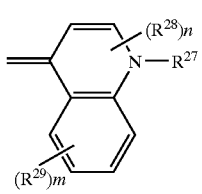

Chemical Formula 86

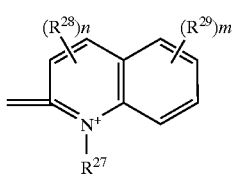

wherein, $R^{27}$ is selected from the group consisting of an alkyl group, alkoxy group, and aryl group; $R^{28}$ and $R^{29}$ are selected from the group consisting of a hydrogen atom, alkyl group, alkoxy group, amino group, nitro group, cyano group, aryl group, alkoxycarbonyl group, sulfonylalkyl group, halogen atom; n is 1 or 2; m is 1, 2, 3, or 4;

Structural Formula XVII:

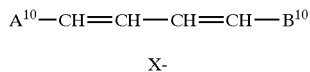

X- wherein X— is selected from the group consisting of Br—, I—, $ClO_4^-$, $BF_4^-$, $PF_6^-$, and $SbF_6^-$; $A^{10}$ is an atomic group selected from the group consisting of Chemical Formulae 87 to 93, and $B^{10}$ is an atomic group selected from the group consisting of Chemical Formulae 94 and 95;

Chemical Formula 87

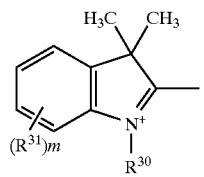

Chemical Formula 88

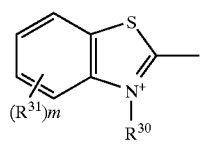

Chemical Formula 89

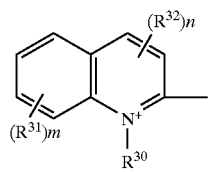

Chemical Formula 90

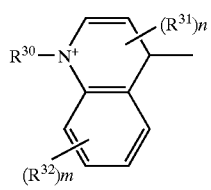

Chemical Formula 91

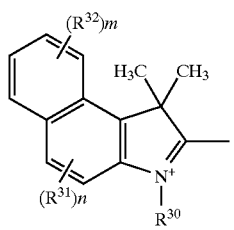

Chemical Formula 92

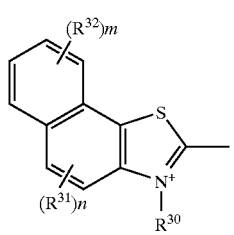

Chemical Formula 93

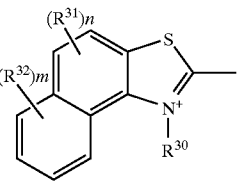

Chemical Formula 94

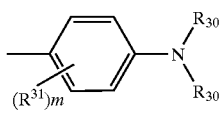

Chemical Formula 95

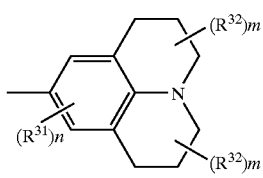

wherein, $R^{30}$ is selected from the group consisting of an alkyl group, alkoxy group, and aryl group; $R^{31}$ and $R^{32}$ are selected from the group consisting of a hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

wherein the recording layer is capable of recording and reproduction with a laser beam having a wavelength from 630 nm to 650 nm;

a singlet oxygen quencher added to the pigments to deactivate singlet oxygen, the singlet oxygen quencher is selected from the group consisting of a nickel metal complex compound, a copper complex compound, a hindered amine compound, an aromatic amine compound, and an aromatic immonium chloride compound;

the recording layer having a thickness of 50 to 1000 nm;

wherein the optical recording medium has a signal modulation degree of 60% or higher and an unrecorded area has a reflection ratio of approximately 50% when measured with a laser beam having a wavelength of 640 nm; and wherein the dependence of the reflection ratio to the wavelength of the laser beam is 640 nm in comparison to the dependence of the reflection ratio to the wavelength of the laser beam outside the range.

5. An optical recording medium comprising recording layer and an optical reflection layer formed on a light transmitting substrate, wherein the recording layer consists of a first dye expressed by Structural Formula XVIII, a second dye expressed by Structural Formula XIX, and a third dye expressed by Structural Formula XX in combination with at least one of a fourth dye expressed by Structural Formula XXI, a fifth dye expressed by Structural Formula XXII, a sixth dye expressed by Structural Formula XXIII, and a seventh dye expressed by Structural Formula XXIV as follows:

Structural Formula XVIII:

X− wherein X— is selected from the group consisting of Br⁻, I⁻, $ClO_4^-$, $BF_4^-$, $PF_6^-$, and $SbF_6^-$; $A^4$ is an atomic group expressed by Chemical Formula 96; and $B^4$ is an atomic group selected from the group consisting of Chemical Formulae 97 and 98;

Chemical Formula 96

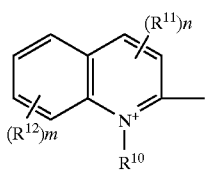

Chemical Formula 97

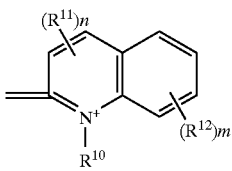

Chemical Formula 98

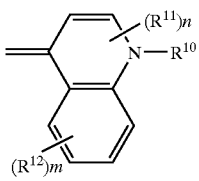

wherein, $R^{10}$ is selected from the group consisting of an alkyl group, alkoxy group, and aryl group; $R^{11}$ and $R^{12}$ are selected from the group consisting of a hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

Structural Formula AIX:

X− wherein X— is selected from the group consisting of Br—, I—, $ClO_4^-$, $BF_4^-$, $PF_6^-$, and $SbF_6^-$; $A^5$ is an atomic group selected from the group consisting of Chemical Formulae 99 to 104; and $B^5$ is an atomic group expressed by Chemical Formula 105;

Chemical Formula 99

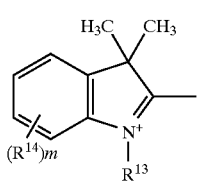

Chemical Formula 100

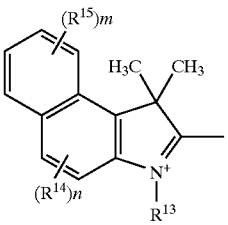

Chemical Formula 101

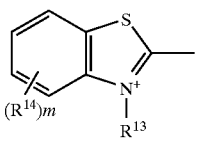

Chemical Formula 102

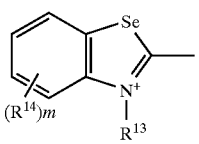

Chemical Formula 103

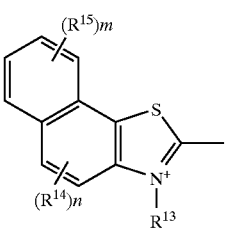

Chemical Formula 104

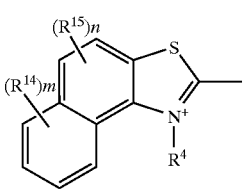

Chemical Formula 105

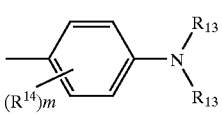

wherein, $R^{13}$ is selected from the group consisting of an alkyl group, alkoxy group, and aryl group; $R^{14}$ and $R^{15}$ are selected from the group consisting of a hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

Structural Formula XX:

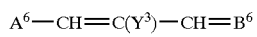

X− wherein X— is selected from the group consisting of Br—, I—, $ClO_4^-$, $BF_4^-$, $PF_6^-$, and $SbF_6^-$; A6 is an atomic group selected from the group consisting of Chemical Formulae 106 to 108; $B^6$ is an atomic group selected from the group consisting of Chemical Formulae 109 and 110; $Y^3$ is selected from the group consisting of a hydrogen atom, alkyl group, or halogen atom; Chemical Formula 106

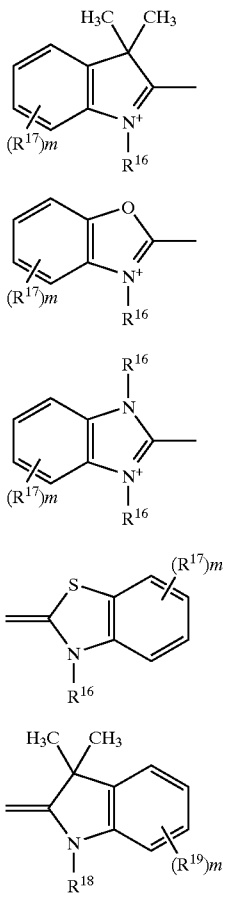

Chemical Formula 107

Chemical Formula 108

Chemical Formula 109

Chemical Formula 110

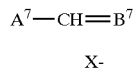

wherein, $R^{16}$ and $R^{18}$ are selected from the group consisting of an alkyl group, alkoxy group, and aryl group; $R^{17}$ and $R^{19}$ are selected from the group consisting of a hydrogen atom, alkyl group, alkoxy group, amino group, vitro group, cyano group, aryl group, alkoxycarbonyl group, sulfonylalkyl group, and halogen atom; n is 1 or 2; m is 1, 2, 3, or 4;

Structural Formula XXI:

$$A^7 - CH = B^7$$
$$X-$$

wherein X— is selected from the group consisting of Br—, I—, $ClO_4^-$, $BF_4^-$, $PF_6^-$, and $SbF_6^-$; $A^7$ is an atomic group expressed by Chemical Formula 111; and $B^7$ is an atomic group expressed by Chemical Formula 112;

Chemical Formula 111

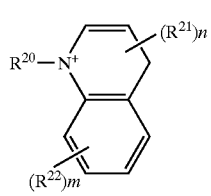

Chemical Formula 112

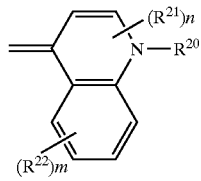

wherein, $R^{20}$ is selected from the group consisting of an alkyl group, alkoxy group, and aryl group; $R^{21}$ and $R^{22}$ are selected from the group consisting of a hydrogen atom, alkyl group, alkoxy group, amino group, vitro group, cyano group, aryl group, alkoxycarbonyl group, sulfonylalkyl group, and halogen atom; n is 1 or 2; m is 1, 2, 3, or 4;

Structural Formula XXII:

$$A^8 - CH = CH - B^8$$
$$X-$$

wherein X— is selected from the group consisting of Br—, I—, $ClO_4^-$, $BF_4^-$, $PF_6^-$, and $SbF_6^-$; $A^8$ is an atomic group selected from the group consisting of Chemical Formulae 113 to 116; $B^8$ is an atomic group expressed by Chemical Formula 117;

Chemical Formula 113

Chemical Formula 114

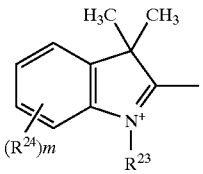

Chemical Formula 115

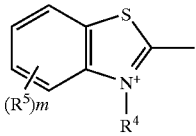

Chemical Formula 116

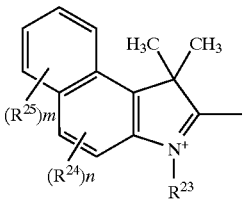

Chemical Formula 117

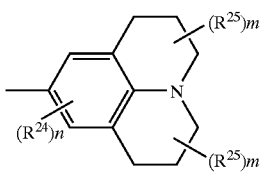

wherein, $R^{23}$ is selected from the group consisting of an alkyl group, alkoxy group, and aryl group; $R^{24}$ and $R^{25}$ are selected from the group consisting of a hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

Structural Formula XXIII: $A^9$—CH=CH—CH=$B^9$
X- wherein X— is selected from the group consisting of Br—, I—, $ClO_4^-$, $BF_4^-$, $PF_6^-$, and $SbF_6^-$; $A^9$ is an atomic group selected from the group consisting of Chemical Formulae 118 to 124; $B^9$ is an atomic group selected from the group consisting of Chemical Formulae 125 and 126;

Chemical Formula 118

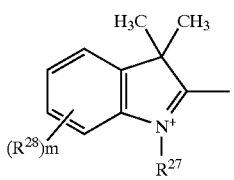

Chemical Formula 119

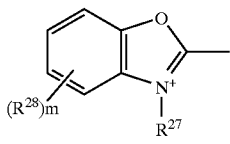

Chemical Formula 120

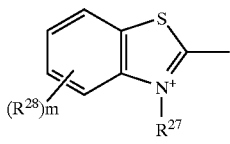

Chemical Formula 121

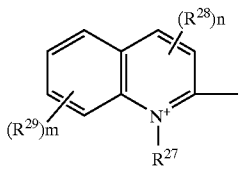

Chemical Formula 122

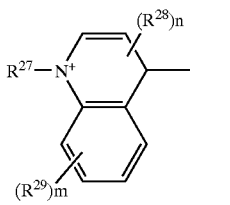

Chemical Formula 123

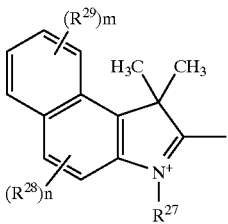

Chemical Formula 124

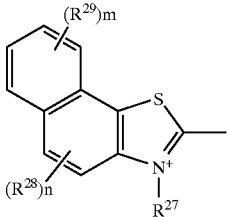

Chemical Formula 125

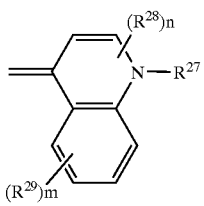

Chemical Formula 126

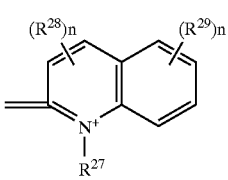

wherein, $R^{27}$ is selected from the group consisting of an alkyl group, alkoxy group, and aryl group; $R^{28}$ and $R^{29}$ are selected from the group consisting of a hydrogen atom, alkyl group, alkoxy group, amino group, vitro group, cyano group, aryl group, alkoxycarbonyl group, sulfonylalkyl group, and halogen atom; n is 1 or 2; m is 1, 2, 3, or 4;

Structural Formula XXIV: $A^{10}$—CH=CH—CH=CH—$B^{10}$I
X- wherein X— is selected from the group consisting of Br—, I—, $ClO_4^-$, $BF_4^-$, $PF_6^-$, and $SbF_6^-$; $A^{10}$ is an atomic group selected from the group consisting of Chemical Formulae 127 to 133; $B^{10}$ is an atomic group selected from the group consisting of Chemical Formulae 134 and 135;

Chemical Formula 127

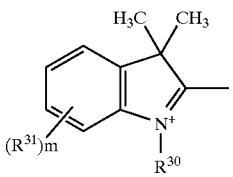

Chemical Formula 128

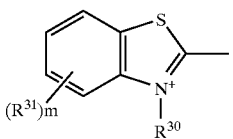

-continued

Chemical Formula 129

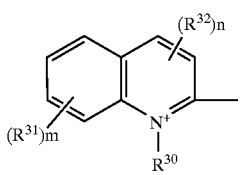

Chemical Fomula 130

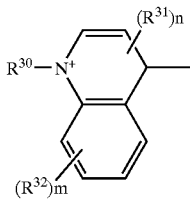

Chemical Formula 131

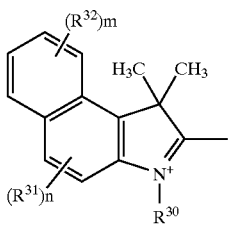

Chemical Formula 130

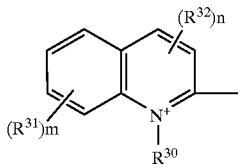

Chemical Formula 131

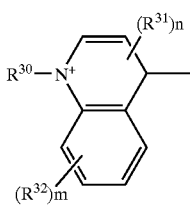

Chemical Formula 132

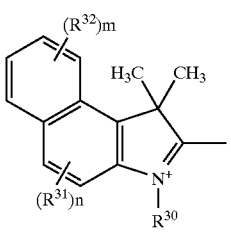

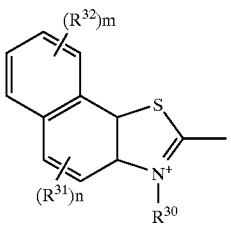

-continued

Chemical Formula 133

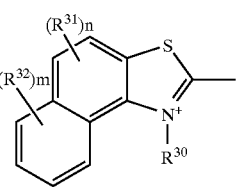

Chemical Formula 134

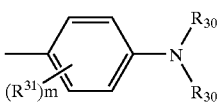

Chemical Formula 135

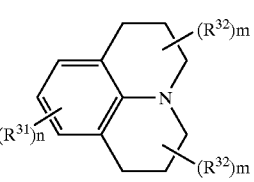

wherein, $R^{30}$ is selected from the group consisting of an alkyl group, alkoxy group, and aryl group; $R^{31}$ and $R^{32}$ are selected from the group consisting of a hydrogen atom, alkyl group, alkoxy group, amino group, nitro group, cyano group, aryl group, alkoxycarbonyl group, sulfonylalkyl group, and halogen atom; n is 1 or 2; m is 1, 2, 3, or 4;

wherein the recording layer is capable of recording and reproduction with a laser beam having a wavelength from 630 nm to 650 nm;

a singlet oxygen quencher added to the pigments to deactivate singlet oxygen, the singlet oxygen quencher is selected from the group consisting of a nickel metal complex compound, a copper complex compound, a hindered amine compound, an aromatic amine compound, and an aromatic immonium chloride compound;

the recording layer having a thickness of 50 to 1000 nm;

wherein the optical recording medium has a signal modulation degree of 60% or higher and an unrecorded area has a reflection ratio of approximately 50% when measured with a laser beam having a wavelength of 640 nm; and wherein the dependence of the reflection ratio to the wavelength of the laser beam is 640 nm in comparison to the dependence of the reflection ratio to the wavelength of the laser beam outside the range.

* * * * *